(12) United States Patent
Egilmez et al.

(10) Patent No.: US 11,206,400 B2
(45) Date of Patent: Dec. 21, 2021

(54) LOW-FREQUENCY NON-SEPARABLE TRANSFORM (LFNST) SIMPLIFICATIONS

(71) Applicant: QUALCOMM Incorporated, San Diego, CA (US)

(72) Inventors: Hilmi Enes Egilmez, San Diego, CA (US); Cheng-Teh Hsieh, Del Mar, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/029,416

(22) Filed: Sep. 23, 2020

(65) Prior Publication Data

US 2021/0099702 A1    Apr. 1, 2021

Related U.S. Application Data

(60) Provisional application No. 62/906,671, filed on Sep. 26, 2019.

(51) Int. Cl.
*H04N 19/119*   (2014.01)
*H04N 19/96*    (2014.01)
*H04N 19/186*   (2014.01)
*H04N 19/176*   (2014.01)

(52) U.S. Cl.
CPC ......... *H04N 19/119* (2014.11); *H04N 19/176* (2014.11); *H04N 19/186* (2014.11); *H04N 19/96* (2014.11)

(58) Field of Classification Search
CPC .. H04N 19/119; H04N 19/176; H04N 19/186; H04N 19/96
See application file for complete search history.

(56) References Cited

U.S. PATENT DOCUMENTS

| | | | |
|---|---|---|---|
| 10,306,229 B2 | 5/2019 | Zhao et al. | |
| 10,349,085 B2 | 7/2019 | Said et al. | |
| 10,448,053 B2 | 10/2019 | Said et al. | |

(Continued)

OTHER PUBLICATIONS

Bossen F., et al., "JEM Software Manual", Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

(Continued)

*Primary Examiner* — Joon Kwon
(74) *Attorney, Agent, or Firm* — Shumaker & Sieffert, P.A.

(57) ABSTRACT

An example method of decoding video data includes receiving encoded data for a current block. The method further includes determining whether single tree partitioning is enabled for the current block and decoding the encoded data to generate luma transform coefficients for the current block and chroma transform coefficients for the current block. The method further includes, in response to determining that the single tree partitioning is enabled for the current block, applying an inverse low-frequency non-separable transform (LFNST) to only the luma transform coefficients for the current block to produce a residual block for the current block. The method further includes reconstructing the current block of the video data using the residual block and a prediction block for the current block.

30 Claims, 12 Drawing Sheets

(56) References Cited

U.S. PATENT DOCUMENTS

| | | | |
|---|---|---|---|
| 10,491,922 | B2 | 11/2019 | Zhao et al. |
| 10,681,379 | B2 | 6/2020 | Zhao et al. |
| 2018/0020218 | A1 | 1/2018 | Zhao et al. |
| 2019/0297351 | A1 | 9/2019 | Said et al. |
| 2019/0373261 | A1 | 12/2019 | Egilmez et al. |
| 2020/0366937 | A1 | 11/2020 | Egilmez et al. |
| 2020/0389666 | A1* | 12/2020 | Zhao ............... H04N 19/625 |

OTHER PUBLICATIONS

Bossen F., et al., "JVET Common Test Conditions and Software Reference Configurations for SDR Video", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1010-v1, pp. 1-6.

Bross B., et al., "Versatile Video Coding (Draft 6)", 127. MPEG and 15th JVET Meeting, Jul. 3, 2019-Jul. 12, 2019, Gothenburg, (Motion Picture Expert Group or JVET of ISO/IEC JTC1/SC29/WG11 and ITU-T SG 16 WP 3), No. m49908, JVET-O2001-vE, Jul. 15, 2019 (Jul. 15, 2019), XP030208562, 455 Pages, Retrieved from the Internet: URL: http://phenix.int-evry.fr/mpeg/doc_end_user/documents/127_Gothenburg/wg11/m49908-JVET-O2001-v8-JVET-O2001-v8.zip JVET-O2001-v8.docx [retrieved on Jul. 15, 2019].

Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), URL: http://phenix.int-evry.fr/jvet/, No. JVET-A1001, Feb. 24, 2016 (Feb. 24, 2016), XP030150000, 27 Pages.

Egilmez H.E., et al., "Non-CE6: Removal of LFNST for 4×4, 4×N and N×4 Blocks", JVET-P0634-v1, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-4.

Fraunhofer HHI., "Transform Coding Using the Residual Quadtree (RQT)", retrieved from: http://www.hhi.fraunhofer.de/fields-of-competence/image-processing/research-groups/image-video-coding/hevc-high-efficiency-video-coding/transform-coding-using-the-residual-quadtree-rqt.html, Mar. 6, 2017, pp. 1-4.

Han J., et al., "Towards Jointly Optimal Spatial Prediction and Adaptive Transform in Video/Image Coding", IEEE International Conference on Acoustics, Speech and Signal Processing (ICASSP), Mar. 2010, pp. 726-729.

Zhao Y., et al., "CE6-2.1: LFNST with 3 Transform Sets", JVET-P0044-v1, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-8.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Jain A.K., "A Sinusoidal Family of Unitary Transforms", IEEE Transactions on Pattern Analysis and Machine Intelligence, IEEE Service Center, Oct. 1, 1979, XP011242370, pp. 356-365, ISSN: 0162-8828.

JVET: "VTM-6.0, Tags, JVET/VVCSoftware_VTM, GitLab", Frank Bossen, https://vcgit.hhi.fraunhofer.de/jvet/VVCSoftware_VTM/-/tags/VTM-6.0, Jul. 2019, pp. 1-4.

Koo (LGE) M., et al., "CE6: Reduced Secondary Transform (RST) (CE6-3.1)", 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N0193, Mar. 27, 2019 (Mar. 27, 2019), XP030256927, pp. 1-19, Retrieved from the Internet: URL: http://phenix.int-evry.fr/jvet/doc_end_user/documents/14_Geneva/wg11/JVET-N0193-v5.zip JVET-N0193 r3.docx, [retrieved on Mar. 27, 2019].

Martucci S.A., et al., "Symmetric Convolution and the Discrete Sine and Cosine Transforms", IEEE Transactions on Signal Processing, IEEE Signal Processing Society, vol. 42, No. 5, May 1, 1994, XP000863873, pp. 1038-1051.

Said A., et al., "CE6: Summary Report on Transforms and Transform Signaling", JVET-M0026, Joint Video Experts Team (JVET) of ITU-T SG 16 WP 3 and ISO/IEC JTC 1/SC 29/WG 11, 13th Meeting, Marrakech, MA, Jan. 9-18, 2019, pp. 1-19.

Said A., et al., "Description of Core Experiment 6 (CE6): Transforms and Transform Signalling", Joint Video Experts Team (JVET) of ITU-T SG 16 WP 3 and ISO/IEC JTC 1/SC 29/WG 11, JVET-L1026-v3, 12th Meeting: Macao, CN, Oct. 3-12, 2018, pp. 1-14.

U.S. Appl. No. 62/799,410, filed Jan. 31, 2019, 34 Pages.

U.S. Appl. No. 62/668,105, filed May 7, 2018, 44 Pages.

Wien M., "High Efficiency Video Coding, Coding Tools and specification", Chapter 5, 2015, pp. 133-160.

Zhao X., et al., "CE6: Summary Report on Transforms and Transform Signaling", JVET-N0026-v1, Joint Video Experts Team (JVET) of ITU-T SG 16 WP 3 and ISO/IEC JTC 1/SC 29/WG 11, 14th Meeting, Geneva, CH, Mar. 19-27, 2019, pp. 1-15.

Zhao X., et al., "CE6: Summary Report on Transforms and Transform Signalling" JVET-O0026-v1, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-8.

Zhao X., et al., "Enhanced Multiple Transform for Video Coding", Data Compression Conference, Mar. 30, 2016, XP033027689, DOI: 10.1109/DCC.2016.9 [retrieved on Dec. 15, 2016] (10 pp).

International Search Report and Written Opinion—PCT/US2020/052484—ISA/EPO—dated Dec. 2, 2020 (16 pp).

Egilmez H.E., "Chroma LFNST Simplification and Signaling", JVET-Q0686-v1, Joint Video Experts Team (JVET) of ITU-T SG 16 WP 3 and ISO/IEC JTC 1/SC 29/WG 11, 17th Meeting: Brussels, BE, Jan. 7-17, 2020, 4 pages.

Hashimoto T., "Non-CE7: Harmonization of scaling matrix and LFNST", JVET-O0383, Joint Video Experts Team (JVET) of ITU-T SG 16 WP 3 and ISO/IEC JTC 1/SC 29/WG 11, 15th Meeting: Gothenburg, SE, Jul. 3-12, 2019, 7 pages.

Nalci A., "Non-CE6: LFNST Signaling at the TU Level", JVET-O0569-v4, Joint Video Experts Team (JVET) of ITU-T SG 16 WP 3 and ISO/IEC JTC 1/SC 29/WG 11, 15th Meeting: Gothenburg, SE, Jul. 3-12, 2019, 8 pages.

Tsukuba T., "Non-CE6: TU/TB-level LFNST index coding", JVET-O0352-v2, Joint Video Experts Team (JVET) of ITU-T SG 16 WP 3 and ISO/IEC JTC 1/SC 29/WG 11, 15th Meeting: Gothenburg, SE, Jul. 3-12, 2019, 8 pages.

Egilmez H.E., et al., "CE6-related: Removal of 4×4, 4×N and N×4 LFNST", JVET-P0xxx-v1, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-4.

* cited by examiner

Inverse LFNST
16x48 matrix

LOW-FREQUENCY NON-SEPARABLE TRANSFORM (LFNST) SIMPLIFICATIONS

This application claims the benefit of U.S. Provisional Application No. 62/906,671, filed Sep. 26, 2019, which is incorporated by reference in its entirety.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for transform coding using a low-frequency non-separable transform (LFNST). A video encoder may represent residual blocks for video data in a form suitable for signaling from the video encoder and for reception by a video decoder. For example, the video encoder may apply a separable transform that converts a residual block in a pixel domain to a coefficient block in a frequency domain and then applies a LFNST to low frequency coefficients while other coefficients are set to zero. In this way, the LFNST may increase energy compaction of the transform coefficient block. In this manner, data used to represent residual blocks may be reduced, thereby reducing bandwidth and/or storage requirements for the video data, and potentially reducing energy usage of the video decoder and video encoder.

Rather than always applying a LFNST for both luma transform coefficients and chroma transform coefficients, techniques described herein may selectively apply the LFNST to chroma transform coefficients based on a partitioning of the video data. For example, a video encoder may apply the LFNST to chroma transform coefficients and refrain from applying the LFNST to chroma transform coefficients when using single-tree partitioning. When using single tree partitioning, a video coder (e.g., a video encoder or a video decoder) may split a block of a luma components for a current block of video data according to a single tree and split corresponding blocks of chroma components for the current block according to the same single tree. When using separate tree partitioning, however, the video coder may split a block of a luma components for a current block of video data according to a dual tree luma and split corresponding blocks of chroma components for the current block according to a dual tree chroma. By applying the LFNST only when performing separate tree partitioning, the video coder (e.g., a video encoder or a video decoder) may potentially reduce a complexity of the video coder and reduce a signaling overhead with little or no loss in prediction accuracy.

In one example, this disclosure describes a method of decoding video data includes receiving encoded data for a current block; determining whether single tree partitioning is enabled for the current block; decoding the encoded data to generate luma transform coefficients for the current block and chroma transform coefficients for the current block; in response to determining that the single tree partitioning is enabled for the current block, applying an inverse low-frequency non-separable transform (LFNST) to only the luma transform coefficients for the current block to produce a residual block for the current block; and reconstructing the current block of the video data using the residual block and a prediction block for the current block.

In another example, this disclosure describes a method of encoding video data includes determining whether single tree partitioning is enabled for a current block; generating residual values for the current block based on a prediction block for the current block; applying a separable transform to the residual values to produce separable luma transform coefficients for the current block and separable chroma transform coefficients for the current block; in response to determining that the single tree partitioning is enabled for the current block, applying a low-frequency non-separable transform (LFNST) to only the separable luma transform coefficients for the current block to produce luma transform coefficients for the current block and chroma transform coefficients for the current block; encoding the luma transform coefficients and the chroma transform coefficients to produce encoded video data; and outputting the encoded video data.

In another example, this disclosure describes a device for decoding video data includes a memory; and process circuitry configured to: receive encoded data for a current block; determine whether single tree partitioning is enabled for the current block; decode the encoded data to generate luma transform coefficients for the current block and chroma transform coefficients for the current block; in response to a determination that the single tree partitioning is enabled for the current block, applying an inverse low-frequency non-separable transform (LFNST) to only the luma transform coefficients for the current block to produce a residual block for the current block; and reconstruct the current block of the video data using the residual block and a prediction block for the current block.

In another example, this disclosure describes a device for encoding video data includes a memory; and process circuitry configured to: determine whether single tree partitioning is enabled for a current block; generate residual values for the current block based on a prediction block for the current block; apply a separable transform to the residual values to produce separable luma transform coefficients for the current block and separable chroma transform coefficients for the current block; in response to a determination that the single tree partitioning is enabled for the current block, applying a low-frequency non-separable transform (LFNST) to only the separable luma transform coefficients for the current block to produce luma transform coefficients for the current block and chroma transform coefficients for the current block; encode the luma transform coefficients and the chroma transform coefficients to produce encoded video data; and output the encoded video data.

In another example, this disclosure describes a computer-readable storage medium having stored thereon instructions that, when executed, configure a processor to: receive encoded data for a current block; determine whether single tree partitioning is enabled for the current block; decode the encoded data to generate luma transform coefficients for the current block and chroma transform coefficients for the current block; in response to a determination that the single tree partitioning is enabled for the current block, applying an inverse low-frequency non-separable transform (LFNST) to only the luma transform coefficients for the current block to produce a residual block for the current block; and reconstruct the current block of the video data using the residual block and a prediction block for the current block.

In another example, this disclosure describes a computer-readable storage medium having stored thereon instructions that, when executed, configure a processor to: determine whether single tree partitioning is enabled for a current block; generate residual values for the current block based on a prediction block for the current block; apply a separable transform to the residual values to produce separable luma transform coefficients for the current block and separable chroma transform coefficients for the current block; in response to a determination that the single tree partitioning is enabled for the current block, applying a low-frequency non-separable transform (LFNST) to only the separable luma transform coefficients for the current block to produce luma transform coefficients for the current block and chroma transform coefficients for the current block; encode the luma transform coefficients and the chroma transform coefficients to produce encoded video data; and output the encoded video data.

In another example, this disclosure describes a device for decoding video data includes means for receiving encoded data for a current block; means for determining whether single tree partitioning is enabled for the current block; means for decoding the encoded data to generate luma transform coefficients for the current block and chroma transform coefficients for the current block; in response to determining that the single tree partitioning is enabled for the current block, applying an inverse low-frequency non-separable transform (LFNST) to only the luma transform coefficients for the current block to produce a residual block for the current block; and means for reconstructing the current block of the video data using the residual block and a prediction block for the current block.

In another example, this disclosure describes a device for encoding video data includes means for determining whether single tree partitioning is enabled for a current block; means for generating residual values for the current block based on a prediction block for the current block; means for applying a separable transform to the residual values to produce separable luma transform coefficients for the current block and separable chroma transform coefficients for the current block; in response to determining that the single tree partitioning is enabled for the current block, applying a low-frequency non-separable transform (LFNST) to only the separable luma transform coefficients for the current block to produce luma transform coefficients for the current block and chroma transform coefficients for the current block; means for encoding the luma transform coefficients and the chroma transform coefficients to produce encoded video data; and means for outputting the encoded video data.

The details of one or more examples are set forth in the accompanying drawings and the description below. Other features, objects, and advantages will be apparent from the description, drawings, and claims.

BRIEF DESCRIPTION OF DRAWINGS

FIG. 7 is a conceptual diagram illustrating an 4×4 inverse LFNST used to reconstruct 16 intermediate coefficients from a list of 16 input coefficients.

FIG. 8 is a conceptual diagram illustrating an 8×8 inverse LFNST used to reconstruct 48 intermediate coefficients form a list of 16 input coefficients.

DETAILED DESCRIPTION

Figure 1:
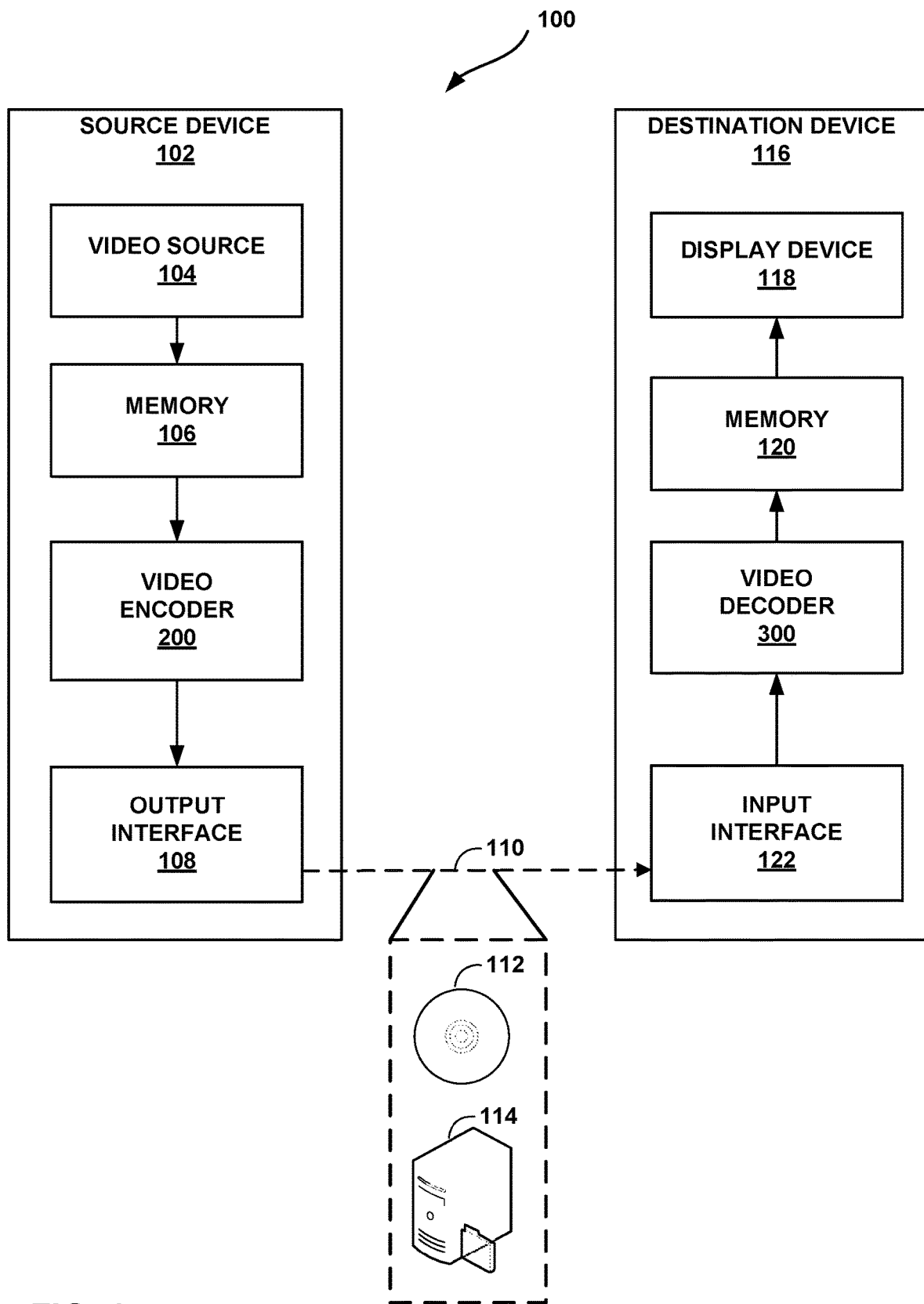
FIG. 1 is a block diagram illustrating an example video encoding and decoding system that may perform the techniques of this disclosure.

In general, this disclosure describes techniques related to low-frequency non-separable transform (LFNST). A video encoder may represent residual blocks for video data in a form suitable for signaling from the video encoder and for reception by a video decoder. It is desirable to reduce an amount of data used to represent the residual blocks such that an amount of data transmitted from the video encoder and received by the video decoder is reduced. In video coding, separable transforms have been applied over non-separable transforms because separable transforms may use fewer operations (e.g., addition, multiplication), as compared to a non-separable transform. Separable transforms are filters that can be written as a product of two or more filters. In contrast, a non-separable filter cannot be written as a product of two or more filters.

Rather than relying solely on a separable transform that converts a residual block in a pixel domain to a coefficient block in a frequency domain, a video encoder may also apply a LFNST to increase energy compaction of the transform coefficient block. For instance, the LFNST may concentrate non-zero coefficients of the transform coefficient block closer to the DC coefficient of the transform coefficient block. As a result, there may be fewer transform coefficients between the DC coefficient of the coefficient block and the last significant (i.e., non-zero) transform coefficient of the transform coefficient block, resulting in a reduced amount of data used to represent the residual block. Similarly, a video decoder may apply an inverse separable transform to transform the transform coefficient block into a residual block. In this manner, data used to represent residual blocks may be reduced, thereby reducing bandwidth and/or storage requirements for the video data, and potentially reducing energy usage of the video decoder and video encoder.

To reduce a complexity of coding with little or no loss in coding accuracy, a video coder (e.g., a video encoder or a video decoder) may be configured to represent a brightness of a block of video data using a luma component and color characteristics of the block of video data using chroma components. The chroma components may include a blue minus luma value ('Cb') and/or a red minus luma value ('Cr'). For example, a video coder (e.g., a video encoder or video decoder) may be configured to represent an 8×8 block by an 8×8 luma block (e.g., 'Y') of luma components, a first 4×4 chroma block (e.g., 'Cr') of chroma components and a second 4×4 chroma block (e.g., 'Cb') of chroma components. That is, the chroma components of a block of video data may be subsampled to have fewer samples than luma components of the block of video data. In this way, sub-sampling chroma components may improve a coding efficiency with little or no loss of coding accuracy.

A video encoder may be configured to partition video data into a plurality of blocks based on a dual tree (e.g., separate tree partitioning) that includes a luma tree, referred to herein as a "dual tree luma," and a chroma tree, referred to herein as a "dual tree chroma." For example, rather than splitting a block of a luma components for a current block of video data according to a single tree (e.g., single tree partitioning) and splitting a corresponding block of chroma components for the current block according to the same single tree, the video encoder may split the luma components for the current block of video data according to the dual tree luma and split the corresponding block of chroma components for the current block according to the dual tree chroma. In this way, the video encoder may split a luma block and chroma blocks for a current block differently, which may potentially reduce an amount of data used to transmit video data with little to no loss in prediction accuracy and/or complexity.

In some examples, a video encoder applying single tree partitioning may partition luma components for a current block into blocks of 8×8 luma transform coefficients. In this example, applying an LFNST to the 8×8 luma transform coefficients may help to significantly reduce an amount of data transmitted with comparably little additional processing burden. When applying single tree partitioning, the video encoder may partition chroma components for the current block into blocks of 4×4 chroma transform coefficients because chroma components may be sub-sampled (e.g., a 4:2:0 chroma sub-sampling) relative to luma components. Applying the LFNST to the 4×4 chroma transform coefficients may significantly add processing burden with little or no comparable decrease in an amount of data transmitted.

In contrast, when applying separate tree partitioning (e.g., dual tree partitioning), the video encoder may partition luma components for the current block into blocks of 8×8 luma transform coefficients and refrain from further splitting the 8×8 chroma blocks. In this example, the video encoder may apply the LFNST to the 8×8 luma transform coefficients and the 8×8 chroma transform coefficients, which may help to significantly reduce an amount of data transmitted with comparably little additional processing burden. Similarly, a video decoder may apply an inverse LFNST to the 8×8 luma transform coefficients and the 8×8 chroma transform coefficients, which may help to significantly reduce an amount of data transmitted with comparably little additional processing burden.

In accordance with the techniques of the disclosure, a video coder (e.g., video encoder or video decoder) may selectively apply the LFNST to chroma transform coefficients based on partitioning. For example, a video encoder may apply the LFNST to chroma transform coefficients when using separate-tree partitioning and refrain from applying the LFNST to chroma transform coefficients when using single-tree partitioning. By applying the LFNST only when performing separate-tree partitioning, the video coder (e.g., a video encoder or a video decoder) may potentially reduce a complexity of the video coder and reduce a signaling overhead with little or no loss in prediction accuracy.

One or more problems may exist in systems where a video encoder applies a 4×4 LFNST (e.g., applying an LFNST on a 4×4 block of transform coefficients) and a video decoder applies an inverse 4×4 LFNST. For example, a video encoder applying a 4×4 LFNST to a 4×4 block of chroma transform coefficients may introduce excessive latency with a two-stage transform process. In some examples, encoding a 4×4 block (e.g., a transform unit (TU)) with LFNST may represent a worst-case latency. Similarly, a video decoder applying an inverse 4×4 LFNST (e.g., applying an inverse LFNST on a 4×4 block of transform coefficients) to a 4×4 block of chroma transform coefficients may introduce excessive latency with a two-stage transform process. In some examples, decoding a 4×4 block (e.g., a TU) with LFNST may represent a worst-case latency.

Techniques described herein may represent one or more solutions to the above listed problems as well as to other problems, and thereby improve the operation of a video coder or video coding process. For example, a video encoder may be configured to, in response to determining that single tree partitioning is enabled for the current block, apply a LFNST to only the separable luma transform coefficients for the current block to produce luma transform coefficients for the current block and chroma transform coefficients for the current block. Similarly, a video decoder may be configured to, in response to determining that single tree partitioning is enabled for the current block, apply an inverse LFNST to only the luma transform coefficients for the current block to produce a residual block for the current block.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for simplifying LFNST. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for simplifying LFNST. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include storage device 112. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a file transfer protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (long-term evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 6)," Joint Video Experts Team (JVET) of ITU-T SG 16 WP 3 and ISO/IEC JTC 1/SC 29/WG 11, 15th Meeting: Gothenburg, SE, 3-12 Jul. 2019, JVET-O2001-vE (hereinafter "VVC Draft 6"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes.

Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform (e.g., an LFNST) following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

In accordance with the techniques of the disclosure, video encoder 200 may determine whether single tree partitioning is enabled for the current block and, in response to a determination that single tree partitioning is enabled for the current block, apply a LFNST to only luma transform coefficients for the current block to produce luma transform coefficients for the current block and chroma transform coefficients for the current block. In contrast, video encoder 200 may, in response to a determination that separate tree partitioning is enabled for the current block, apply a LFNST to both luma transform coefficients for the current block and chroma transform coefficients for the current block to produce luma transform coefficients for the current block and chroma transform coefficients for the current block.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block.

In accordance with the techniques of the disclosure, video decoder 300 may determine whether single tree partitioning is enabled for the current block and, in response to a determination that single tree partitioning is enabled for the current block, apply an inverse LFNST to only luma transform coefficients for the current block to produce a residual block for the current block. In contrast, video decoder 300 may, in response to a determination that separate tree partitioning is enabled for the current block, apply an inverse LFNST to both luma transform coefficients for the current block and chroma transform coefficients for the current block to produce a residual block for the current block.

Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 may be configured to generate residual values for a current block based on a prediction block for the current block and apply a separable transform to the residual values to produce separable luma transform coefficients for the current block and separable chroma transform coefficients for the current block. Video encoder 200 may be configured to, in response to determining that single tree partitioning is enabled for the current block, apply a LFNST to only the separable luma transform coefficients for the current block to produce luma transform coefficients for the current block and chroma transform coefficients for the current block. Video encoder 200 may be configured to encode the luma transform coefficients and the chroma transform coefficients to produce encoded video data and output the encoded video data.

In accordance with the techniques of this disclosure, video decoder 300 may be configured to receive encoded data for a current block and decode the encoded data to generate luma transform coefficients for the current block and chroma transform coefficients for the current block. Video decoder 300 may be configured to determine whether single tree partitioning is enabled for the current block. Video decoder 300 may be configured to, in response to determining that single tree partitioning is enabled for the current block, apply an inverse LFNST to only the luma transform coefficients for the current block to produce a residual block for the current block and reconstruct the current block of the video data using the residual block and a prediction block for the current block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
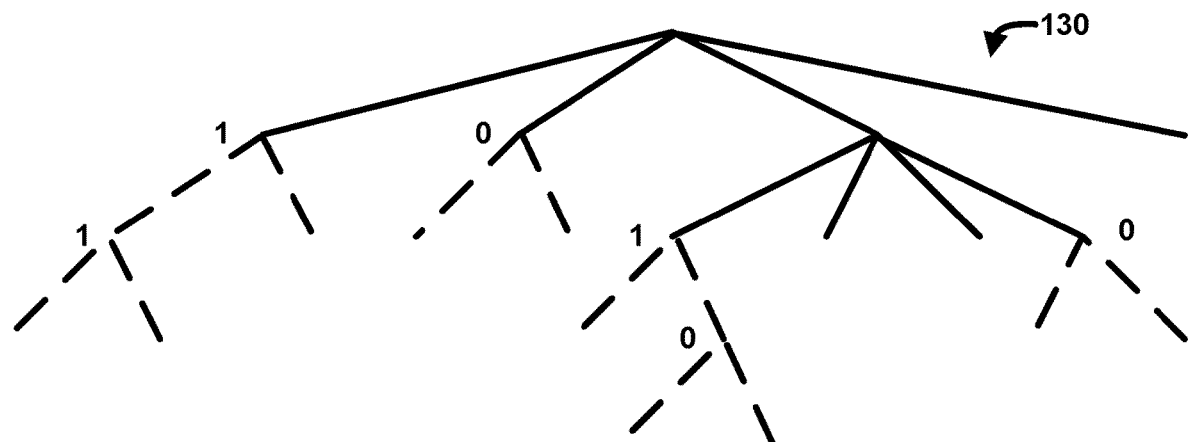
FIGS. 2A and 2B are conceptual diagrams illustrating an example quadtree binary tree (QTBT) structure, and a corresponding coding tree unit (CTU).
Figure 2B:
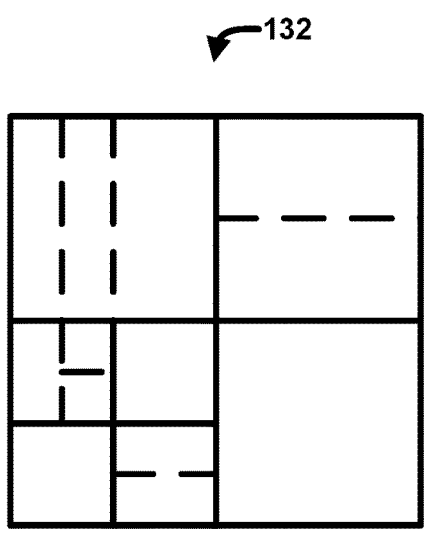

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level (i.e., the first level) of QTBT structure 130 (i.e., the solid lines) and syntax elements (such as splitting information) for a prediction tree level (i.e., the second level) of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the quadtree leaf node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies that no further vertical splitting is permitted. Similarly, a binary tree node having a height equal to MinBTSize implies that no further horizontal splitting is permitted for that binary tree node. As noted above, leaf nodes of the binary tree are referred to as CUs, and are further processed according to prediction and transform without further partitioning.

Figure 3:
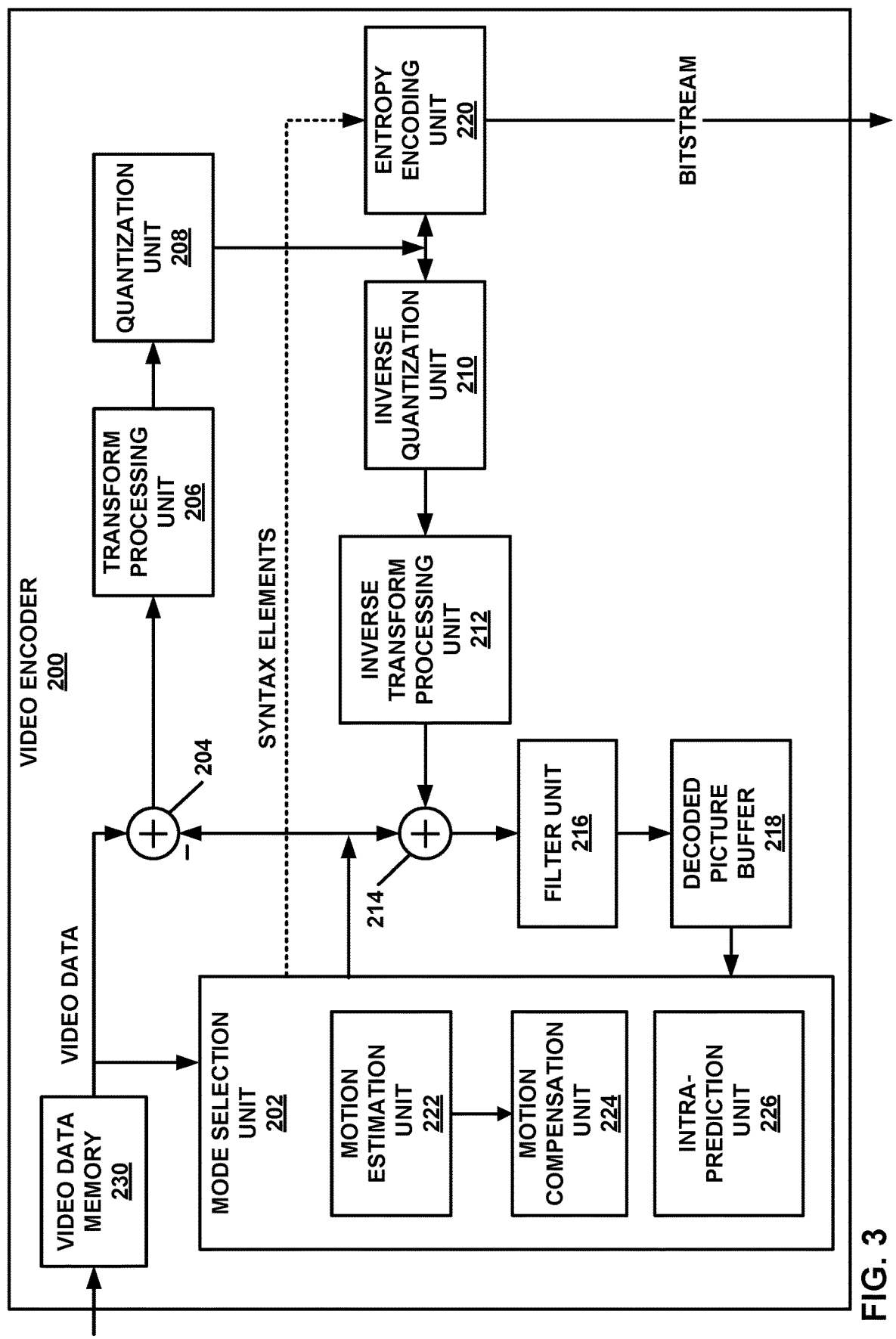
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block." Again, the tree structure may include a single tree for both luma blocks and for chroma blocks (e.g., single tree partitioning) and dual tree (e.g., separate tree partitioning). With a dual tree, video encoder 200 may partition luma blocks using a first tree (e.g., dual tree luma) and partition chroma blocks using a second tree (e.g., dual tree chroma).

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like.

Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×29N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

In accordance with the techniques of this disclosure, transform processing unit 206 may be configured to, in response to a determination that single tree partitioning is enabled for the current block, apply a LFNST to only the separable luma transform coefficients for the current block to produce luma transform coefficients for the current block and chroma transform coefficients for the current block. For example, in response to mode selection unit 202 determining to apply single tree partitioning, transform processing unit 206 may apply a LFNST to only the separable luma transform coefficients for the current block to produce luma transform coefficients for the current block and chroma transform coefficients for the current block. In contrast, in response to mode selection unit 202 determining to apply separate tree partitioning (e.g., dual tree partitioning), transform processing unit 206 may apply a LFNST to both the separable luma transform coefficients for the current block and the separable chroma transform coefficients for the current block to produce luma transform coefficients for the current block and chroma transform coefficients for the current block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. In some examples, inverse transform processing unit 212 may apply techniques described herein for a simplified LFNST. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and process circuitry configured to determine whether single tree partitioning is enabled for a current block and generate residual values for a current block based on a prediction block for the current block. Video encoder 200 may be further configured to apply a separable transform to the residual values to produce separable luma transform coefficients for the current block and separable chroma transform coefficients for the current block. Video encoder 200 may be configured to, in response to a determination that single tree partitioning is enabled for the current block, apply a LFNST to only the separable luma transform coefficients for the current block to produce luma transform coefficients for the current block and chroma transform coefficients for the current block. Video encoder 200 may be configured to encode the luma transform coefficients and the chroma transform coefficients to produce encoded video data and output the encoded video data.

Figure 4:
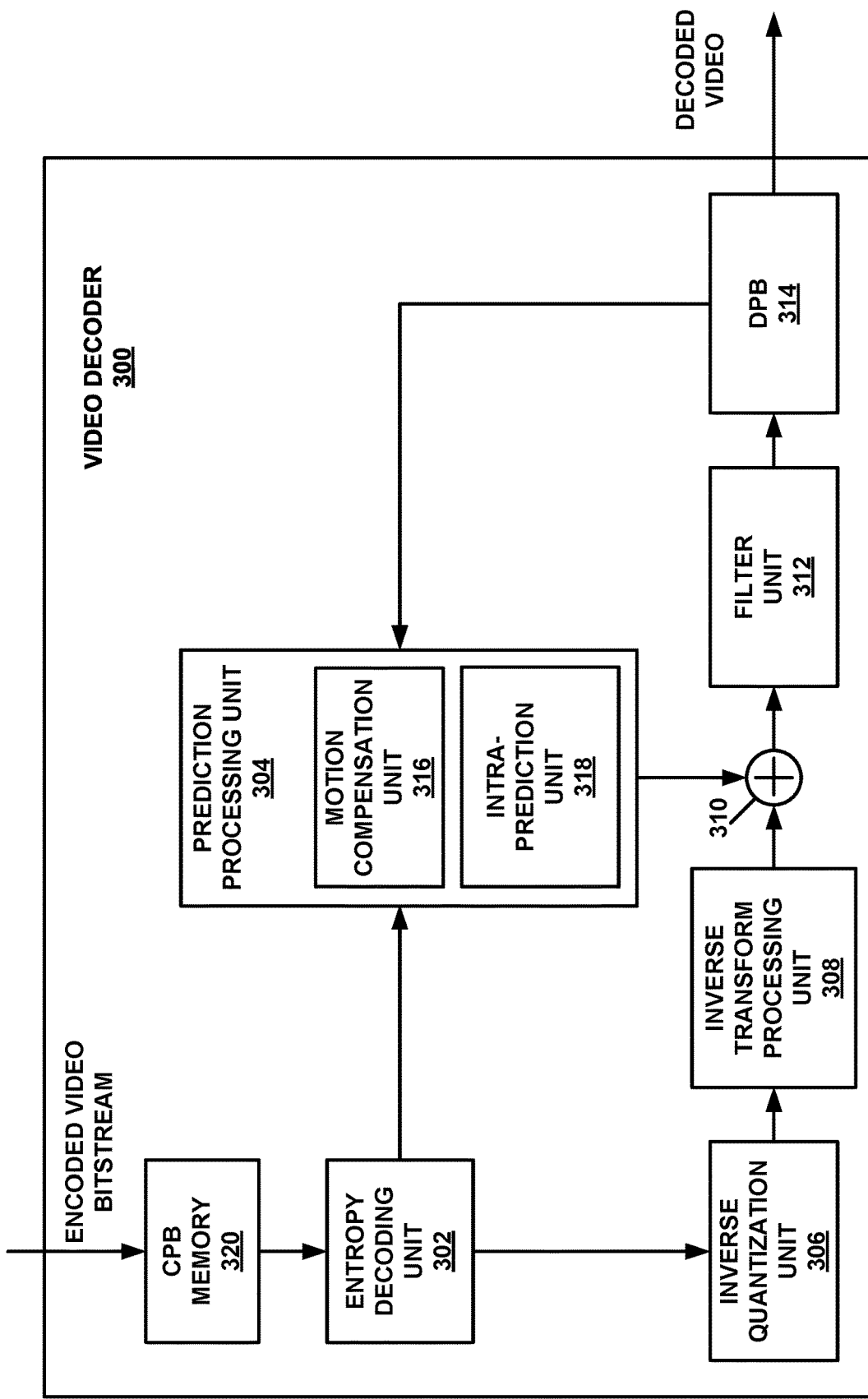
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block. In some examples, inverse transform processing unit 308 may apply techniques described herein for a simplified LFNST.

In accordance with the techniques of this disclosure, inverse transform processing unit 308 may be configured to, in response to a determination that single tree partitioning is enabled for the current block, apply an inverse LFNST to only the separable luma transform coefficients for the current block to produce a residual block for the current block. For example, in response to prediction processing unit 304 determining to apply single tree partitioning, inverse transform processing unit 308 may apply an inverse LFNST to only the separable luma transform coefficients for the current block to produce a residual block for the current block. That is, inverse transform processing unit 308 may refrain from applying the inverse LFNST to separable chroma transform coefficients for the current block. In contrast, in response to prediction processing unit 304 determining to apply separate tree partitioning (e.g., dual tree partitioning), inverse transform processing unit 308 may apply an inverse LFNST to both the separable luma transform coefficients for the current block and the separable chroma transform coefficients for the current block to produce a residual block for the current block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to: receive encoded data for a current block and decode the encoded data to generate luma transform coefficients for the current block and chroma transform coefficients for the current block. Video decoder 300 may be configured to determine whether single tree partitioning is enabled for the current block. Video decoder 300 may be configured to, in response to determining that single tree partitioning is enabled for the current block, apply an inverse LFNST to only the luma transform coefficients for the current block to produce a residual block for the current block and reconstruct the current block of the video data using the residual block and a prediction block for the current block.

This disclosure is related to transform coding, which is typically a fundamental element of modern video compression standards. This disclosure includes techniques directed to various low-frequency non-separable transform designs that can simplify some existing techniques, including the design in VVC Draft 6. Techniques described herein may be used in other advanced video codecs including extensions of HEVC and the next generation of video coding standards.

In video coding standards prior to HEVC, only a fixed separable transform is used where DCT-2 is used both vertically and horizontally. In HEVC, in addition to DCT-2, DST-7 is also employed for 4×4 blocks as a fixed separable transform. Examples of multiple transform selection (MTS) techniques may be found in, for example, U.S. Pat. No. 10,306,229, U.S. Pub. No. 2018/0020218, and U.S. patent application Ser. No. 16/426,749, each of which is incorporated herein by reference. MTS was previously called Adaptive Multiple Transforms (AMT), which is only a name change and the technique is the same. An example of MTS in U.S. Pub. No. 2018/0020218 has been adopted in Joint Video Experts Team (WET) of ITU-T SG 16 WP 3 and ISO/IEC JTC 1/SC 29/WG 11, JEM Software, https://jvet.hhi.fraunhofer.de/svn/svn_HMJEMSoftware/tags/HM-16.6-JEM-7.0 (hereinafter "Joint Experimental Model-7.0" or simply "JEM-7.0"), and later a simplified version of MTS is adopted in VVC Draft 6.

Figure 5:
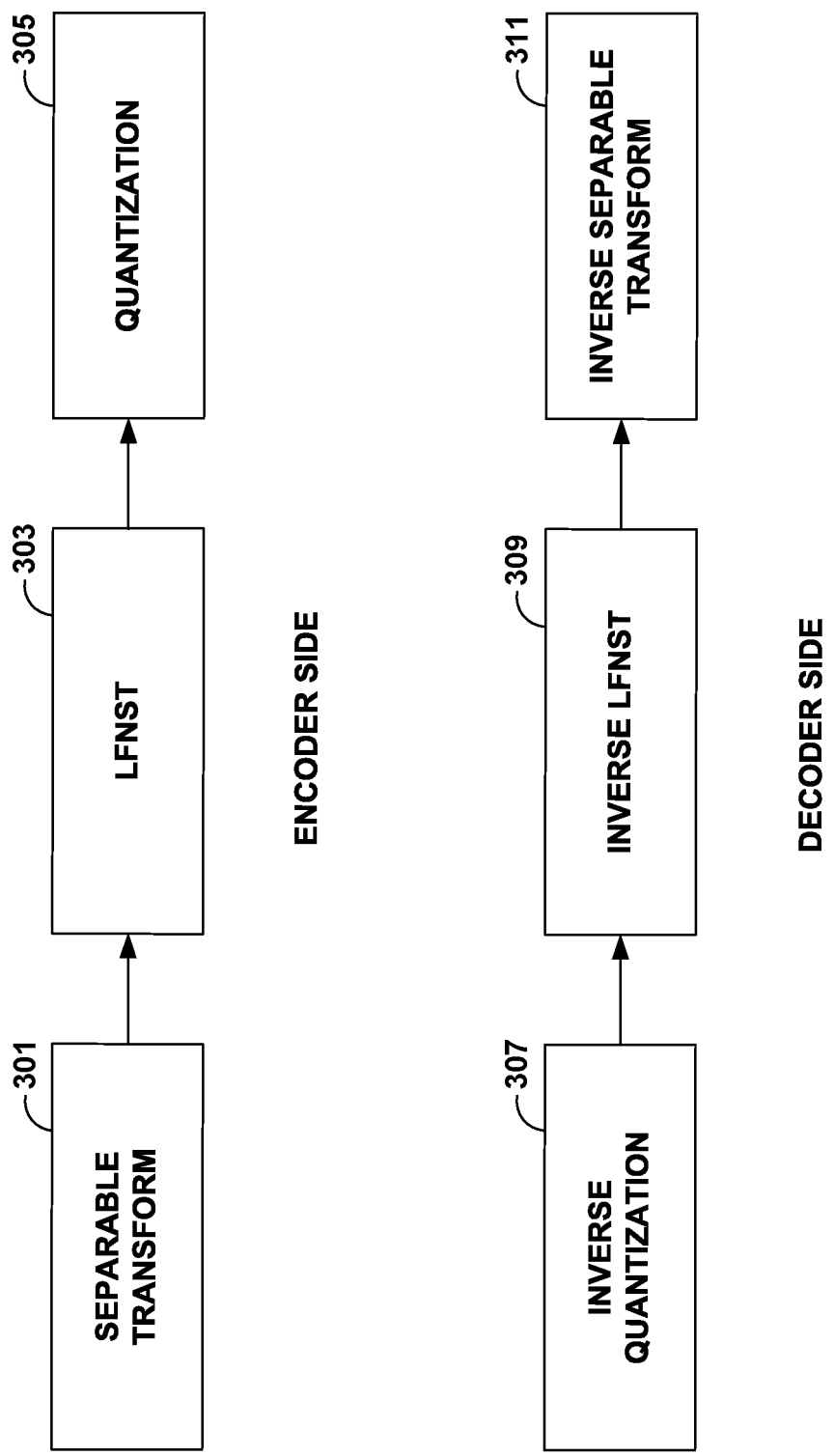
FIG. 5 is a conceptual diagram illustrating low-frequency non-separable transform (LFNST) at encoder and decoder sides where LFNST introduces a new stage between separable transformation and quantization in a codec.

Low-Frequency Non-separable Transformation (LFNST), illustrated in FIG. 5, is used in JEM-7.0 to further improve the coding efficiency of MTS, where an example implementation of LFNST is described in U.S. Patent No. 10,448,053, which is hereby incorporated herein by reference. Examples of alternative implementations of LFNST may also be found in, for example, U.S. Patent Pub. No. 2017/009431, U.S. Patent Pub. No. 2017/0094314, U.S. Pat. No. 10,349,085, U.S. Patent Application 62/668,105, and U.S. patent application Ser. No. 16/364,007, each of which is incorporated herein by reference. Recently, LFNST has been adopted in WET-N0193, Reduced Secondary Transform (RST) (CE6-3.1), Online available: http://phenix.it-sudparis.eu/jvet/doc_end_user/documents/14 Geneva/wg11/WET-N0193-v5.zip. LFNST is previously called non-separable secondary transform (NSST) or secondary transform where all these abbreviations same.

In the example of FIG. 5, video encoder 200 may apply a separable transform 301 to residual values of a current block to produce separable transform coefficients, apply LFNST 303 to the separable transform coefficients to produce transform coefficients, and apply quantization 305 the transform coefficients to generate quantized transform coefficients. Similarly, video decoder 300 may apply inverse quantization 307 quantized transform coefficients to generate transform coefficients, apply an inverse LFNST 309 to the transform coefficients to generate separable transform coefficients, and apply an inverse separable transform 311 to the transform coefficients to generate residual values.

Figure 6:
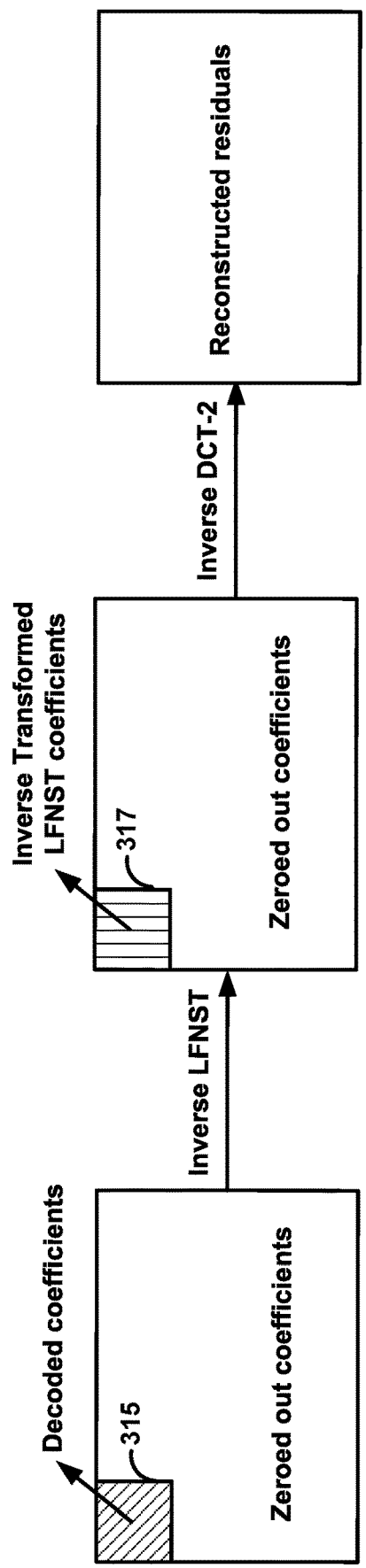
FIG. 6 is a conceptual diagram illustrating an inverse transform process when LFNST is used.

A decoding process with LFNST is described in the following. The inverse transformation with LFNST involves following steps as illustrated in FIG. 6:
1) The decoded transform coefficients (see the shaded subblock 315 in FIG. 6) are used as input to the inverse LFNST by first converting the 2-D block into a 1-D list (or vector) of coefficients via pre-defined scanning/ordering;
2) An inverse LFNST is applied to the 1-D list of input coefficients and the output coefficients are reorganized into 2-D block via pre-defined scanning/ordering (see the shaded subblock 317 in FIG. 6);
3) The inverse transformed LFNST coefficients are used as input the separable inverse DCT-2 to obtain reconstructed residuals.

Figure 7:
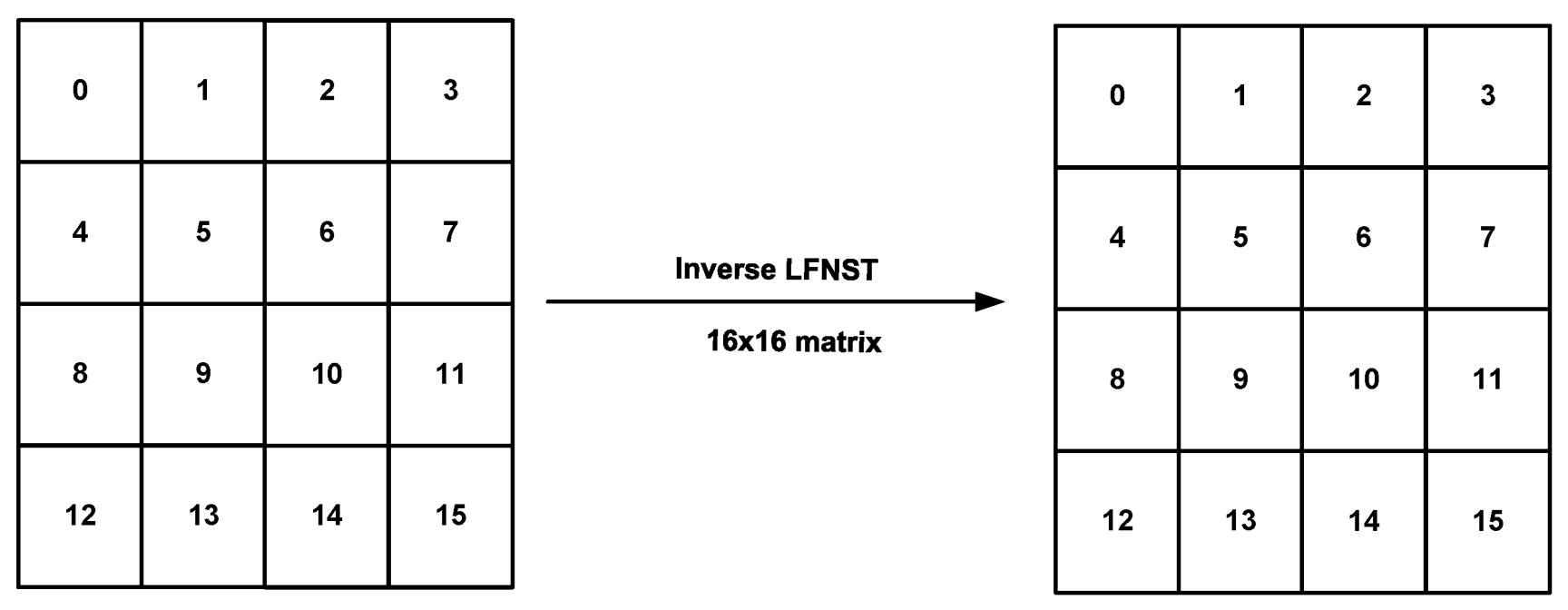

In VVC Draft 6, LFNST can be applied to 4×4 and 8×8 subblocks. In both cases, 16 decoded coefficients in a 4×4 subblock (some of which may be normatively zeroed-out) are input to an inverse LFNST:
 For the 4×4 case, a 16×16 inverse LFNST is used to construct 16 intermediate coefficients before the separable inverse DCT-2 as shown in FIG. 7.
 For the 8×8 case, a 16×48 inverse LFNST is used to construct 48 intermediate coefficients before the separable inverse DCT-2 as shown in FIG. 7. Note that 48 intermediate coefficients are reorganized in an L-shaped pattern.

An inverse LFNST processes can be fully defined based on (i) a transform (i.e., LFNST) matrix and (ii) a reorganization pattern/scan for intermediate coefficients.

Example details of the zero-out process in VVC Draft 6 are described in U.S. Patent Application No. 62/849,689, which is incorporated herein by reference.

FIG. 7 is a conceptual diagram illustrating an 4×4 inverse LFNST used to reconstruct 16 intermediate coefficients from a list of 16 input coefficients. For a 4×4 LFNST, a video coder (e.g., video encoder 200 or video decoder 300) may use the following two patterns/scans depending on intra mode:

```
const int g_lfnstRGScan4x4 [16] =
{ // 0 1 2 3 4 5 6 7 8 9 10 11 12 13 14 15
    0, 1, 2, 3, 4, 5, 6, 7, 8, 9, 10, 11, 12, 13, 14, 15
};
const int g_lfnstRGTranScan4x4[16] =
{ // 0 1 2 3 4 5 6 7 8 9 10 11 12 13 14 15
    0, 4, 8, 12, 1, 5, 9, 13, 2, 6, 10, 14, 3, 7, 11, 15
};
``` where above two patterns/scans indicate the reordering of intermediate coefficients. For example, g lfnstRGScan4×4 does not change the row-major reordering of coefficients. However, lfnstRGTranScan4×4 reorders by transposing the order of coefficients (e.g., coefficients at 1,2,3,6,7 and 11 are swapped with coefficients at 4,8,12,9,13 and 14, respectively).

Figure 8:
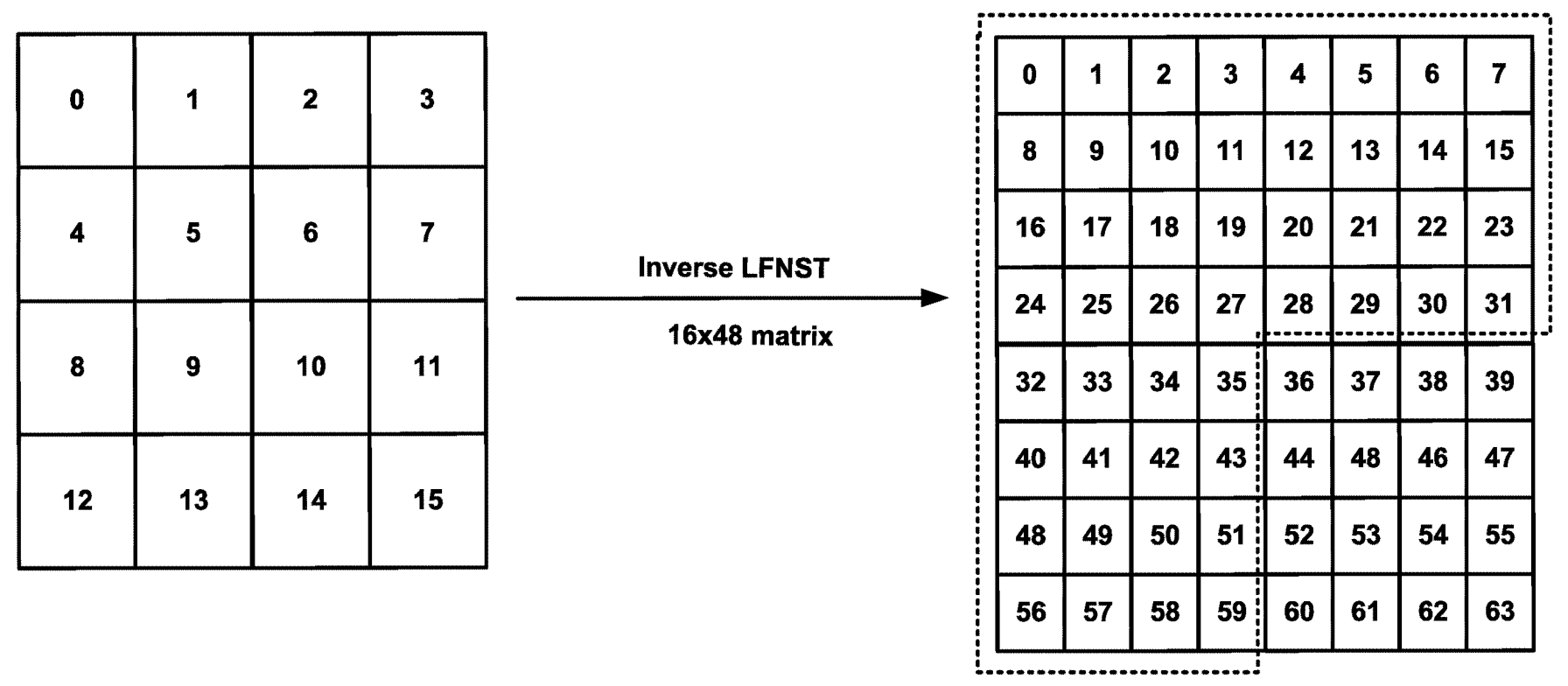

FIG. 8 is a conceptual illustration of an 8×8 inverse LFNST used to reconstruct 48 intermediate coefficients form a list of 16 input coefficients. The intermediate coefficients are reorganized in an L-shaped pattern as shown by the dashed line. For 4×4 LFNST, a video coder may use eight 16×16 matrices as candidates in VVC draft 6, which are listed in Section 8.7.4.3 of WET-02001. The intermediate coefficients are reorganized in an L-shaped pattern.

For an 8×8 LFNST, a video coder may use the following two patterns/scans depending on intra mode:

```
const int g_lfnstRGScan8x8 [48] =
{ // 0 1 2 3 4 5 6 7 8 9 10 11 12 13 14 15 16 17 18 19 20 21
22 23 24 25 26 27 28 29 30 31 32 33 34 35 36 37 38 39 40 41 42 43 44
45 46 47
    0, 1, 2, 3, 4, 5, 6, 7, 8, 9, 10, 11, 12, 13, 14, 15, 16, 17, 18, 19, 20, 21,
22, 23, 24, 25, 26, 27, 28, 29, 30, 31, 32, 33, 34, 35, 40, 41, 42, 43, 48, 49, 50, 51, 56,
57, 58, 59
};
const int g_lfnstRGTranScan8x8[48] =
{ // 0 1 2 3 4 5 6 7 8 9 10 11 12 13 14 15 16 17 18 19 20 21
22 23 24 25 26 27 28 29 30 31 32 33 34 35 36 37 38 39 40 41 42 43 44
45 46 47
    0, 8, 16, 24, 32, 40, 48, 56, 1, 9, 17, 25, 33, 41, 49, 57, 2, 10, 18, 26, 34,
42, 50, 58, 3, 11, 19, 27, 35, 43, 51, 59, 4, 12, 20, 28, 5, 13, 21, 29, 6, 14, 22, 30, 7,
15, 23, 31
};
``` where above two patterns/scans indicate the reordering of intermediate coefficients. Specifically, g_lfnstRGScan8×8 reorganizes 48 intermediate coefficients in the L-shaped pattern (e.g., the 48th coefficient is mapped to location 59 in FIG. 8). The scan lfnstRGTranScan4×4 reorders the L-shaped pattern by transposing coefficients (e.g., the 48th coefficient is mapped to location 31 in FIG. 8).

For 8×8 LFNST, eight 16×48 matrices are used as candidates in VVC Draft 6, which are listed in Section 8.7.4.3 of JVET-O2001.

In VVC draft 6, LFNST is applied to either a 4×4 or an 8×8 top-left subblock (e.g., a LFNST subblock) in a TU. For example, for both a 4×4 LFNST and an 8×8 LFNST, there are 4 transform sets, each of which consist of 2 LFNST matrices. A set is selected depending on intra mode, and an LFNST index is signaled to choose among 2 LFNST matrices used for transformation. A problem with the 4×4 LFNST is that the 4×4 LFNST may introduce unwanted latency with a two-stage transform process. Coding a 4×4 TU with LFNST may increase latency and the coding benefit of 4×4 LFNST is very limited for HD and UHD sequences. Moreover, in VVC draft 6, LFNST is enabled for coding chroma blocks, which may also be complex and provide a limited benefit. This document proposes to remove the 4×4 LFNST (e.g., applied to 4×4, N×4 and 4×N blocks) to reduce the worst-case latency in the transformation step. In addition, removing the 4×4 LFNST may reduce the 8 KB memory requirement for storing LFNST matrices to 6 KB.

Additionally, this disclosure proposes to disable the LFNST for 4×4, 4×N and N×4 blocks and to reduce latency, which may be helpful for small blocks, and may reduce 2 KB of memory. Experimental results show that the proposed simplification may lead to 0.16% AI and 0.10% RA luma BD-rate losses over VTM-6.0, and the video encoder runtime may be reduced about 10% for AI coding.

This disclosure describes the following techniques for a LFNST, which may be used individually or in any combination.

In a first example, LFNST can only be used for blocks whose width and height are greater than 4. For example, a video coder (e.g., video encoder 200 or video decoder 300) may use LFNST only for blocks whose width and height are greater than 4. That is, the video coder may determine whether the current block comprises a height greater than 4 and determine whether the current block comprises a width greater than 4. In this example, video encoder 200 may apply a LFNST in response to determining that the height is greater than 4 and the width is greater than 4. Similarly, video decoder 300 may apply an inverse LFNST in response to determining that the height is greater than 4 and the width is greater than 4.

In a second example, only 8×8 LFNST can be used for blocks whose width and height are greater than 4, and the zero-out region can be outside of the 8×8 LFNST subblock (i.e., the size of the shaded subblock 317 in FIG. 6 can only be 8×8). As used herein, zero-out region may refer to a region of a block where samples values are set to zero. A video coder (e.g., video encoder 200 or video decoder 300) may use an 8×8 LFNST only for blocks whose width and height are greater than 4, and the zero-out region is outside of the 8×8 LFNST subblock (e.g., the size of shaded subblock 315 in FIG. 6 is only 8×8).

That is, the video coder may determine whether the current block comprises a height greater than 4, determine whether the current block comprises a width greater than 4, and determine whether a zero-out region of the luma transform coefficients is outside of the 8×8 LFNST subblock. In this example, video encoder 200 may apply an LFNST (e.g., apply an 8×8 LFNST to an 8×8 LFNST sub-block of separable luma transform coefficients) in response to determining that the height is greater than 4, the width is greater than 4, and the zero-out region of the luma transform coefficients is outside of the 8×8 LFNST subblock. Similarly, video decoder 300 may apply an inverse LFNST (e.g., apply an inverse 8×8 LFNST to an 8×8 LFNST sub-block of luma transform coefficients) in response to determining that the height is greater than 4, the width is greater than 4, and the zero-out region of the luma transform coefficients is outside of the 8×8 LFNST subblock.

In a third example, an LFNST index may not be signaled for blocks whose width and height are greater than 4. For example, in response to determining a block includes a width that is greater than 4 and a height that is greater than 4, video encoder 200 may refrain from signaling a LFNST index.

In a fourth example, if separate-tree (e.g., dual-tree) partitioning is used, LFNST index/flag can be signaled separately for luma and chroma channels, and LFNST is only used and signaled if luma/chroma block width and height are greater than 4. For example, in response to determining that separate-tree portioning is used, a video coder may only use LFNST if luma/chroma block width and height are greater than 4. In some examples, in response to determining that separate-tree portioning is used, video encoder 200 may signal a LFNST index/flag separately for luma and chroma channels if luma/chroma block width and height are greater than 4.

In a fifth example, if single-tree partitioning is used (e.g., if chroma block splits are inferred from luma block splits), a LFNST index/flag can be signaled for luma only. For example, in response to determining single-tree partitioning is used, video encoder 200 may signal a LFNST index/flag for luma only (and refrain from signaling an LFNST index/flag for chroma).

For example, if a luma or chroma coded block's width and height are greater than 4, then LFNST is applied and LFNST index/flag is signaled. For example, in response to determining a luma or a chroma coded block width and height are greater than 4, a video coder may apply LFNST. In some examples, in response to determining a luma or a chroma coded block width and height are greater than 4, video encoder 200 may signal a LFNST index/flag.

In some examples, if a luma block's size is 8×8, 8×N or N×8 for N>8, the corresponding chroma block's size is 4×4, 4×(N/2) and (N/2)×4, in this case, LFNST is signaled and only applied for the luma block, and it is not applied for the chroma block. For example, in response to determining that a luma block size is 8×8, 8×N or N×8 for N>8 and that the corresponding chroma block size is 4×4, 4×(N/2) or (N/2)×4, a video coder may only apply LFNST for the luma block and refrain from applying LFNST for the chroma block. In some examples, in response to determining that a luma block size is 8×8, 8×N or N×8 for N>8 and that the corresponding chroma block size is 4×4, 4×(N/2) or (N/2)×4, video encoder 200 may signal a LFNST index/flag for the luma block and refrain from signaling LFNST for the chroma block.

In a sixth example, a video coder (e.g., video encoder 200 or video decoder 300) may apply LFNST to luma blocks only and/or video encoder 200 may signal LFNST only for luma blocks. For example, in separate tree (dual-tree) partitioning, chroma blocks LFNST can be disabled and not signaled. For example, in response to separate tree (e.g., dual-tree) partitioning, a video coder may disable chroma block LFNST. In some examples, in response to separate tree (e.g., dual-tree) partitioning, video encoder 200 may refrain from signaling chroma block LFNST.

In a seventh example, if separate-tree (dual-tree) partitioning is enabled, the LFNST can be used for both luma and chroma blocks, and LFNST index/flag can be signaled separately. For example, in response to determining that separate tree (e.g., dual-tree) partitioning is enabled, a video coder (e.g., video encoder 200 or video decoder 300) may use the LFNST for both luma and chroma blocks. That is, video encoder 200 may, in response to determining that separate tree partitioning is enabled for the current block, apply a LFNST to separable luma transform coefficients for a current block to produce luma transform coefficients for the current block and apply the LFNST to separable chroma transform coefficients for the current block to produce chroma transform coefficients for the current block. Similarly, video decoder 300 may, in response to determining that separate tree partitioning is enabled for the current block, apply an inverse LFNST to both luma transform coefficients and chroma transform coefficients to produce a residual block for a current block. In some examples, in response to determining that separate tree (e.g., dual-tree) partitioning is enabled, video encoder 200 may signal LFNST index/flag can be signaled separately.

In an eighth example, if single-tree partitioning is enabled, LFNST can only be applied for luma blocks, and for chroma blocks LFNST can be disabled. That is, video encoder 200 may, in response to determining that single tree partitioning is enabled for a current block, disable LFNST for the separable chroma transform coefficients for the current block. Similarly, video encoder 200 may, in response to determining that single tree partitioning is enabled for a current block, disable an inverse LFNST for the chroma transform coefficients for the current block.

For example, in response to determining that single tree partitioning is enabled, a video coder may use LFNST for only luma blocks and disable LFNST for chroma blocks. That is, video encoder 200 may, in response to determining that single tree partitioning is enabled for the current block, apply a LFNST to only separable luma transform coefficients for a current block to produce luma transform coefficients for the current block and chroma transform coefficients for the current block. Similarly, video decoder 300 may, in response to determining that single tree partitioning is enabled for the current block, apply an inverse LFNST to only the luma transform coefficients for the current block to produce a residual block for the current block.

In some examples, in response to determining that single-tree partitioning is enabled, video encoder 200 may signal a LFNST index/flag for luma blocks and refrain from signaling an index/flag for chroma blocks. In this case, an LFNST index/flag is signaled only for luma blocks. That is, video encoder 200 may, in response to a determination that single tree partitioning is enabled for a current block, signal an LFNST index in the encoded data for the luma transform coefficients for the current block and refrain from signaling an LFNST index in encoded data for the chroma transform coefficients. Similarly, video decoder 300 may, in response to a determination that single tree partitioning is enabled for a current block, determine an LFNST index from encoded data for the luma transform coefficients for the current block and refrain from determining an LFNST index from the encoded data for the chroma transform coefficients.

In a ninth example, only 4×4 LFNST can be used for blocks whose width and height are greater than 4, and the zero-out region can be outside of the 4×4 LFNST subblock (i.e., the size of the shaded subblock 317 in FIG. 6 can only be 4×4). For example, in response to determining that a block includes a width greater than 4 and a height greater than 4 and that the zero-out region can be outside of the 4×4 LFNST subblock (e.g., the size of the shaded subblock 317 in FIG. 6 can only be 4×4), a video coder may use 4×4 LFNST.

That is, the video coder may determine whether the current block comprises a height greater than 4, determine whether the current block comprises a width greater than 4, and determine whether a zero-out region of the luma transform coefficients is outside of the 4×4 LFNST subblock. In this example, video encoder 200 may apply a LFNST (e.g., apply a 4×4 LFNST to an 4×4 LFNST sub-block of the separable luma transform coefficients) in response to determining that the height is greater than 4, the width is greater than 4, and the zero-out region of the luma transform coefficients is outside of the 4×4 LFNST subblock. Similarly, video decoder 300 may apply an inverse LFNST (e.g., apply an inverse 4×4 LFNST to a 4×4 LFNST sub-block of the luma transform coefficients) in response to determining that the height is greater than 4, the width is greater than 4, and the zero-out region of the luma transform coefficients is outside of the 4×4 LFNST subblock.

In some examples, combining examples one through five above can be implemented with the following changes (additions are indicated by +++ and deletions are indicated by ***) relative to the VVC Draft 6 text (JVET-O2001-v14):

```
        transform_tree( x0, y0, cbWidth, cbHeight, treeType )
        lfnstWidth = ( treeType ==
DUAL_TREE_CHROMA ) ? cbWidth / SubWidthC
                            : cbWidth
        lfnstHeight = ( treeType ==
DUAL_TREE_CHROMA ) ? cbHeight / SubHeightC
                            : cbHeight
            if( Min( lfnstWidth, lfnstHeight ) ***>=*** +++>+++ 4 &&
sps_lfnst_enabled_flag == 1 &&
                CuPredMode[ chType ][ x0 ][ y0 ] == MODE_INTRA &&
                IntraSubPartitionsSplitType == ISP_NO_SPLIT &&
                ( !intra_mip_flag[ x0 ][ y0 ] || Min( lfnstWidth, lfnstHeight ) >= 16 ) &&
                tu_mts_idx[ x0 ][ y0 ] == 0 && Max( cbWidth, cbHeight ) <=
MaxTbSizeY ) {
                if( LfnstDcOnly == 0 && LfnstZeroOutSigCoeffFlag == 1 )
                    lfnst_idx[ x0 ][ y0 ]                                   ae(v)
            }
        }
```

Inputs to this process are:
 a luma location (xTbY, yTbY) specifying the top-left sample of the current luma transform block relative to the top-left luma sample of the current picture,
 a variable nTbW specifying the width of the current transform block,
 a variable nTbH specifying the height of the current transform block,
 a variable cIdx specifying the colour component of the current block,
 an (nTbW)×(nTbH) array d[x][y] of scaled transform coefficients with x=0 .nTbW−1, y=0 .nTbH−1.

Output of this process is the (nTbW)×(nTbH) array r[x][y] of residual samples with x=0.nTbW−1, y=0 .nTbH−1.

When lfnst_idx[xTbY][yTbY] is not equal to 0 and both nTbW and nTbH are greater than * or equal to* 4, the following applies:
The variables predModeIntra, nLfnstOutSize, log 2Lfnst-Size, nLfnstSize, and nonZeroSize are derived as follows:
  predModeIntra=(cIdx==0)? IntraPredModeY[xTbY][yTbY]:IntraPredModeC[xTbY][y TbY] (8-965)
  nLfnstOutSize=* (nTbW>=8 && nTbH>=8)? * 48 *: 16* (8-966)
  log 2LfnstSize=* (nTbW>=8 && nTbH>=8)? * 3 * : 2* (8-967) nLfnstSize=1<<log 2LfnstSize (8-968)
  nonZeroSize=(*(nTbW==4 && nTbH==4) || * (nTbW==8 && nTbH==8))? 8 : 16 (8-969)
When intra_mip_flag[xTbComp][yTbComp] is equal to 1 and cIdx is equal to 0, predModeIntra is set equal to INTRA PLANAR.
The variables nonZeroW and nonZeroH are derived as follows:
If lfnst idx[xTbY][yTbY] is not equal to 0 and nTbW is greater than * or equal to* 4 and nTbH is greater than * or equal to* 4, the following applies:
  nonZeroW=* (nTbW==4 || nTbH==4)? 4: * 8 (8-977) nonZeroH=*(nTbW==4 || nTbH==4)? 4 : * 8 (8-978)
Otherwise, the following applies:
  nonZeroW=Min(nTbW, (trTypeHor>0)? 16 : 32) (8-979)
  nonZeroH=Min(nTbH, (trTypeVer>0)? 16 : 32) (8-980)

Figure 9:
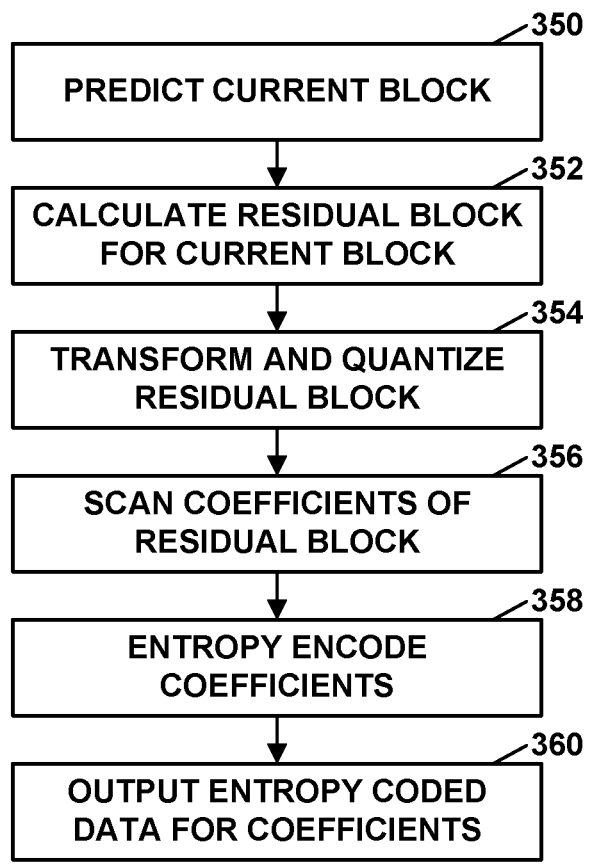
FIG. 9 is a flowchart illustrating an example method for encoding a current block of video data, in accordance with the techniques of the disclosure.

FIG. 9 is a flowchart illustrating an example method for encoding a current block. The current block may comprise a current CU. Although described with respect to video encoder 200 (FIGS. 1 and 3), it should be understood that other devices may be configured to perform a method similar to that of FIG. 9.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block.

Video encoder 200 may then transform and quantize coefficients of the residual block (354). For example, video encoder 200 may, in response to a determination that single tree partitioning is enabled for a current block, apply a LFNST to only separable luma transform coefficients for the current block to produce luma transform coefficients for the current block and chroma transform coefficients for the current block. In response, however, to a determination that separate tree partitioning is enabled for the current block, video encoder 200 may apply the LFNST to the separable luma transform coefficients for the current block to produce luma transform coefficients for the current block and apply the LFNST to the separable chroma transform coefficients for the current block to produce second chroma transform coefficients for the current block.

Video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may encode the transform coefficients using LFNST based on partitioning. Video encoder 200 may then output the entropy encoded data of the block (360).

Figure 10:
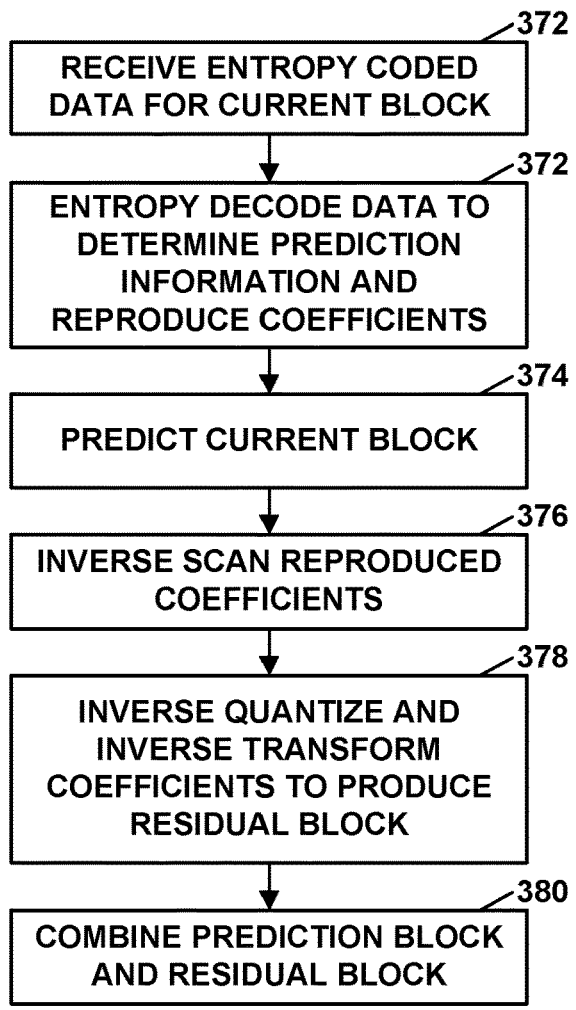
FIG. 10 is a flowchart illustrating an example method for decoding a current block of video data, in accordance with the techniques of the disclosure.

FIG. 10 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 10.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). For example, Video decoder 300 may decode the transform coefficients using LFNST based on partitioning. Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients.

Video decoder 300 may then inverse quantize and inverse transform the transform coefficients to produce a residual block (378). For example, video decoder 300 may, in response to a determination that single tree partitioning is enabled for a current block, apply an inverse LFNST to only luma transform coefficients for the current block to produce a residual block for the current block for the current block. In response, however, to a determination that separate tree partitioning is enabled for the current block, video decoder 300 may apply the inverse LFNST to the luma transform coefficients for the current block and the chroma transform coefficients for the current block to produce a residual block for the current block. Video decoder 300 may ultimately decode the current block by combining the prediction block and the residual block (380).

The proposed simplification is implemented on top of VTM-6.0 and evaluated under common test conditions (CTC). Note that low-delay B results are omitted, since LFNST is disabled in CTC for low-delay B. Table 1 presents the results of removing 4×4 LFNST over VTM-6.0.

TABLE 1

Results of proposed simplification over VTM-6.0 under CTC

| | Over VTM-6.0 | | | | |
|---|---|---|---|---|---|
| | Y | U | V | EncT | DecT |
| | All Intra | | | | |
| Class A1 | 0.00% | 0.41% | 0.39% | 91% | 100% |
| Class A2 | −0.01% | 0.99% | 1.22% | 90% | 101% |
| Class B | 0.13% | 0.98% | 0.93% | 89% | 101% |
| Class C | 0.36% | 0.91% | 1.33% | 89% | 103% |
| Class E | 0.28% | 0.43% | 0.40% | 91% | 101% |
| Overall | 0.16% | 0.78% | 0.89% | 90% | 101% |
| Class D | 0.34% | 1.20% | 1.35% | 85% | 98% |
| Class F | 0.31% | 0.61% | 0.86% | 92% | 99% |
| | Random Access Main 10 | | | | |
| Class A1 | 0.02% | 0.52% | 0.29% | 99% | 100% |
| Class A2 | 0.07% | 0.57% | 0.63% | 100% | 101% |
| Class B | 0.07% | 1.07% | 1.09% | 98% | 100% |
| Class C | 0.21% | 0.54% | 0.67% | 100% | 103% |
| Class E | | | | | |
| Overall | 0.10% | 0.72% | 0.72% | 99% | 101% |
| Class D | 0.12% | 0.57% | 0.93% | 97% | 99% |
| Class F | 0.16% | 0.27% | 0.45% | 98% | 99% |

In accordance with the techniques of the disclosure, a video coder (e.g., video encoder 200 or video decoder 300) may remove 4×4 LFNST to reduce the worst-case latency in transformation process. The experimental results show that the coding benefit of a 4×4 LFNST is very limited, especially for UHD sequences under AI and RA configurations.

Figure 11:
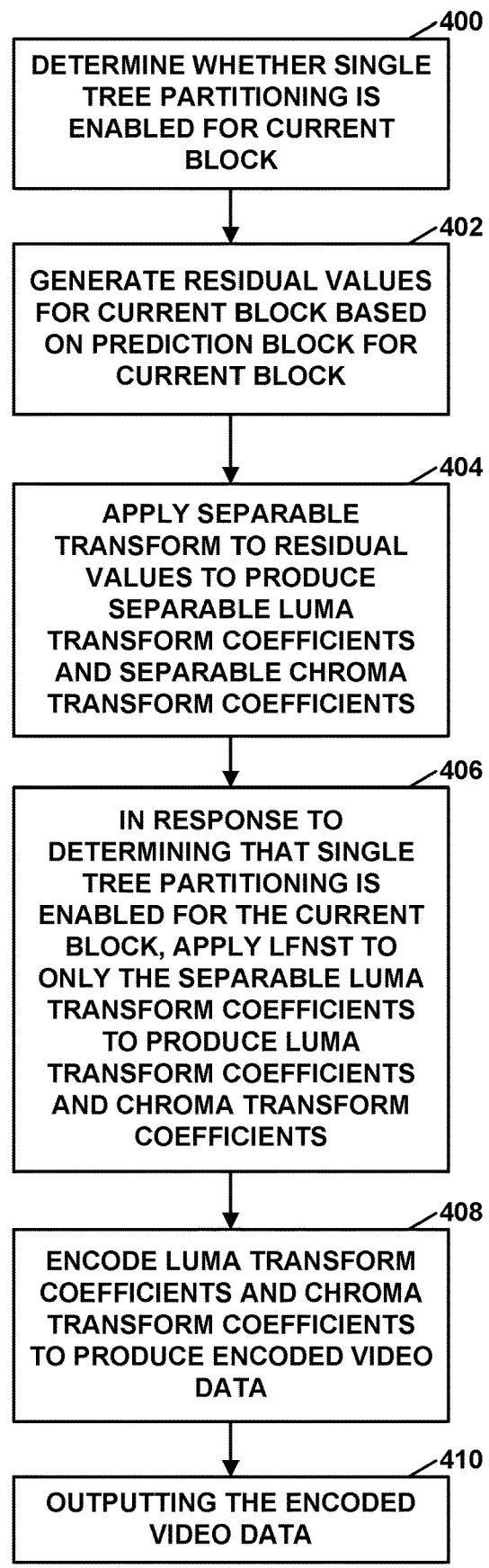
FIG. 11 is a flowchart illustrating an example method for encoding a current block of video data based on partitioning, in accordance with the techniques of the disclosure.

FIG. 11 is a flowchart illustrating an example method for encoding a current block of video data based on partitioning, in accordance with the techniques of the disclosure. Video encoder 200 (e.g., mode selection unit 202) may determine whether single tree partitioning is enabled for a current block (400). Video encoder 200 (e.g., residual generation unit 204) may generate residual values for a current block based on a prediction block for the current block (402). For example, video encoder 200 (e.g., residual generation unit 204) may generate a chroma residual block for the current block and a luma residual block for the current block.

Video encoder 200 (e.g., transform processing unit 206) may apply a separable transform to the residual values to produce separable luma transform coefficients for the current block and separable chroma transform coefficients for the current block (404). For example, video encoder 200 (e.g., residual generation unit 204) may apply a separable transform to residual values of the chroma residual block for the current block to generate separable chroma transform coefficients for the current block and apply the separable transform to residual values of the luma residual block for the current block to generate separable luma transform coefficients for the current block.

Video encoder 200 (e.g., transform processing unit 206) may, in response to a determination that single tree partitioning is enabled for the current block, apply a LFNST to only the separable luma transform coefficients for the current block to produce luma transform coefficients for the current block and chroma transform coefficients for the current block (406). For example, video encoder 200 (e.g., residual generation unit 204) may apply the LFNST to the separable luma transform coefficients for the current block to produce luma transform coefficients for the current block. In this example, video encoder 200 (e.g., residual generation unit 204) may refrain from applying the LFNST to the separable chroma transform coefficients for the current block (e.g., bypass the LFNST) to produce chroma transform coefficients for the current block.

In response, however, to determining that separate tree partitioning is enabled for the current block, video encoder 200 may apply a LFNST to both the separable luma transform coefficients for the current block to produce luma transform coefficients for the current block and the separable chroma transform coefficients for the current block to produce chroma transform coefficients for the current block. For example, video encoder 200 (e.g., residual generation unit 204) may apply the LFNST to the separable luma transform coefficients for the current block to produce luma transform coefficients for the current block. In this example, video encoder 200 (e.g., residual generation unit 204) may apply the LFNST to the separable chroma transform coefficients for the current block to produce chroma transform coefficients for the current block.

In some examples, video encoder 200 may determine whether the current block comprises a height greater than 4 and determine whether the current block comprises a width greater than 4. In this example, video encoder 200 may apply the LFNST to only the luma transform coefficients further in response to determining that the height is greater than 4 and the width is greater than 4.

In some examples, video encoder 200 may determine whether the current block comprises a height greater than 4 and determine whether the current block comprises a width greater than 4. In this example, video encoder 200 may apply the LFNST to only the luma transform coefficients further in response to determining that the height is greater than 4 and the width is greater than 4.

In some examples, video encoder 200 may determine whether the current block comprises a height greater than 4, determine whether the current block comprises a width greater than 4, and determine whether a zero-out region of the luma transform coefficients is outside of the 8×8 LFNST subblock for the LFNST. In this example, video encoder 200 may apply the LFNST to only the luma transform coefficients further in response to determining that the height is greater than 4, the width is greater than 4, and the zero-out region of the luma transform coefficients is outside of the 8×8 LFNST subblock for the LFNST.

In some examples, video encoder 200 may determine whether the current block comprises a height greater than 4, determine whether the current block comprises a width greater than 4, and determine whether a zero-out region of the luma transform coefficients is outside of a 4×4 LFNST subblock for the LFNST. In this example, video encoder 200 may apply the LFNST to only the luma transform coefficients further in response to determining that the height is greater than 4, the width is greater than 4, and the zero-out region of the luma transform coefficients is outside of the 4×4 LFNST subblock for the LFNST.

Video encoder 200 (e.g., quantization unit 208 and entropy encoding unit 220) may encode the luma transform coefficients and the chroma transform coefficients to produce encoded video data (408). For example, quantization unit 208 may quantize the luma transform coefficients to generate quantized luma transform coefficients and quantize the chroma transform coefficients to generate quantized luma transform coefficients. In this example, entropy encoding unit 220 may encode (e.g., entropy encode) the quantized luma transform coefficients and the quantized chroma transform coefficients to generate encoded video data. Video encoder 200 (e.g., entropy encoding unit 220) may output the encoded video data (410).

In some examples, video encoder 200 may signal an LFNST index (e.g., an LFNST flag). For example, in response to a determination that single tree partitioning is enabled for a current block, video encoder 200 may signal an LFNST index in the encoded data for the luma transform coefficients for the current block and refrain from signaling an LFNST index in the encoded data for the chroma transform coefficients. In response, however, to a determination that separate tree partitioning is enabled for a current block, video encoder 200 may signal an LFNST index in the encoded data for the luma transform coefficients for the current block and signal an LFNST index in the encoded data for the chroma transform coefficients.

Figure 12:
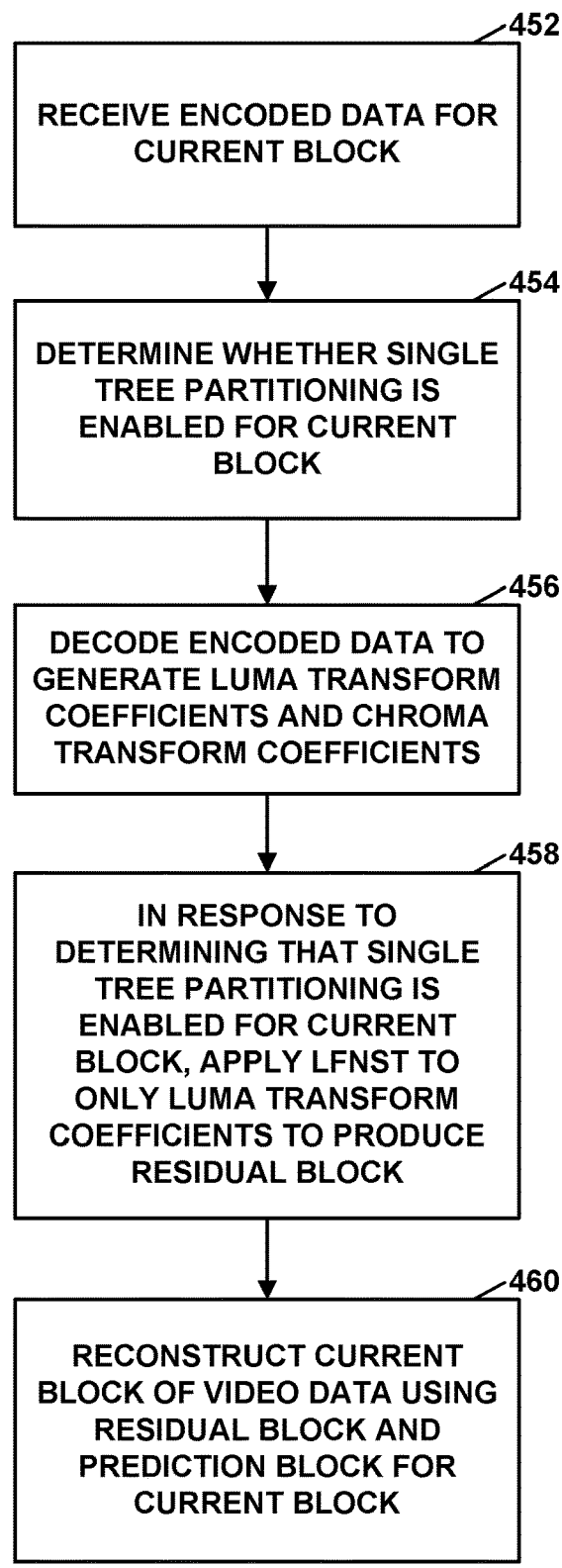
FIG. 12 is a flowchart illustrating an example method for decoding a current block of video data based on partitioning, in accordance with the techniques of the disclosure.

FIG. 12 is a flowchart illustrating an example method for decoding a current block of video data based on partitioning, in accordance with the techniques of the disclosure. Video decoder 300 (e.g., entropy decoding unit 302) may receive encoded data for a current block (452). Video decoder 300 (e.g., prediction processing unit 304) may determine whether single tree partitioning is enabled for the current block (454). For example, video decoder 300 may receive an indication of whether the video data for the current block is partitioned using single tree partitioning or separate tree partitioning signaled by video encoder 200. In some examples, video decoder 300 may determine whether the video data for the current block is partitioned using single tree partitioning or separate tree partitioning based on implicit signaling or without signaling by video encoder 200.

Video decoder 300 (e.g., entropy decoding unit 302) may decode the encoded data to generate luma transform coefficients for the current block and chroma transform coefficients for the current block (456). For example, video decoder 300 (e.g., entropy decoding unit 302) may decode (e.g., entropy decode) quantized luma transform coefficients for a current block and quantized chroma transform coefficients for the current block. In this example, video decoder 300 (e.g., inverse quantization unit 306) may inverse quantize the quantized luma transform coefficients to generate luma transform coefficients and inverse quantize the quantized chroma transform coefficients to generate chroma transform coefficients. In some examples, the inverse quantization of the luma transform coefficients and/or the chroma transform coefficients may be bypassed.

Video decoder 300 (e.g., inverse transform processing unit 308) may, in response to a determination that single tree partitioning is enabled for the current block, apply an inverse LFNST to only the luma transform coefficients for the current block to produce a residual block for the current block (458). For example, video decoder 300 (e.g., inverse transform processing unit 308) may apply the inverse LFNST to the luma transform coefficients for the current block to produce a luma residual block for the current block. In this example, video decoder 300 (e.g., inverse transform processing unit 308) may refrain from applying the inverse LFNST to the chroma transform coefficients (e.g., bypass the inverse LFNST) to produce a chroma residual block for the current block. After performing the inverse LFNST, video decoder 300 (e.g., inverse transform processing unit 308) may apply an inverse separable transform to the luma transform coefficients generated by the inverse LFNST (e.g., separable luma transform coefficients) to generate the luma residual block and apply an inverse separable transform to the inverse quantized chroma transform coefficients to generate the chroma residual block (e.g., a Cr residual block or a Cb residual block).

In response, however, to determining that separate tree partitioning is enabled for the current block, video decoder 300 (e.g., inverse transform processing unit 308) may apply an inverse LFNST to both the luma transform coefficients and the chroma transform coefficients to produce a residual block. For example, video decoder 300 (e.g., inverse transform processing unit 308) may apply the inverse LFNST to the luma transform coefficients for the current block to produce a luma residual block for the current block. In this example, video decoder 300 (e.g., inverse transform processing unit 308) may apply the inverse LFNST to the luma transform coefficients to produce a chroma residual block for the current block. Again, after performing the inverse LFNST, video decoder 300 (e.g., inverse transform processing unit 308) may apply an inverse separable transform to the separable luma transform coefficients to generate the luma residual block. Similarly, video decoder 300 (e.g., inverse transform processing unit 308) may apply an inverse separable transform to the separable chroma transform coefficients to generate the chroma residual block.

In some examples, video decoder 300 may determine whether the current block comprises a height greater than 4 and determine whether the current block comprises a width greater than 4. In this example, video decoder 300 may apply the inverse LFNST to only the luma transform coefficients further in response to determining that the height is greater than 4 and the width is greater than 4.

In some examples, video decoder 300 may determine whether the current block comprises a height greater than 4, determine whether the current block comprises a width greater than 4, and determine whether a zero-out region of the luma transform coefficients is outside of a 8×8 LFNST subblock for the inverse LFNST. In this example, video decoder 300 may apply the inverse LFNST to only the luma transform coefficients further in response to determining that the height is greater than 4, the width is greater than 4, and the zero-out region of the luma transform coefficients is outside of the 8×8 LFNST subblock.

In some examples, video decoder 300 may determine whether the current block comprises a height greater than 4, determine whether the current block comprises a width greater than 4, and determine whether a zero-out region of the luma transform coefficients is outside of a 4×4 LFNST subblock for the inverse LFNST. In this example, video decoder 300 may apply the inverse LFNST to only the luma transform coefficients further in response to determining that the height is greater than 4, the width is greater than 4, and the zero-out region of the luma transform coefficients is outside of the 4×4 LFNST subblock.

Video decoder 300 (e.g., reconstruction unit 310) may reconstruct the current block of the video data using the residual block and a prediction block for the current block (460). For example, video decoder 300 (e.g., reconstruction unit 310) may reconstruct the current block by combining the luma residual block for the current block and a luma prediction block for the current block and combining the chroma residual block for the current block and a chroma prediction block for the current block. Video decoder 300 (e.g., DPB 314) may output the encoded video data.

In some examples, video decoder 300 may determine an LFNST index (e.g., an LFNST flag). For example, in response to a determination that the single tree partitioning is enabled for the current block, video decoder 300 may determine an LFNST index from the encoded data for the luma transform coefficients for the current block and refrain from determining an LFNST index from the encoded data for the chroma transform coefficients. In response, however, to a determination that the separate tree partitioning is enabled for the current block, video decoder 300 may determine an LFNST index from the encoded data for the luma transform coefficients for the current block and determine an LFNST index from the encoded data for the chroma transform coefficients. The LFNST index may indicate a type of inverse LFNST and/or whether the LFNST is enabled.

A non-limiting illustrative list of examples of the techniques of this disclosure is provided below.

Example 1. A method of coding video data, the method comprising: determining whether a block comprises height greater than 4; determining whether the block comprises width greater than 4; in response to determining that the block comprises height greater than 4 and width greater than 4, applying a low-frequency non-separable transform (LFNST) to the block; and in response to determining that the block comprises height that is equal to or less than 4 or width that is equal to or less than 4, refraining from applying the LFNST to the block.

Example 2. The method of coding video data, the method comprising: determining whether a block comprises height greater than 4; determining whether the block comprises width greater than 4; determining whether a zero-out region is outside of an 8×8 LFNST subblock; in response to determining that the block comprises height greater than 4, that the block comprises width greater than 4, and that the zero-out region is outside of the 8×8 LFNST subblock, using the 8×8 LFNST.

Example 3. A method of coding video data, the method comprising: determining whether a block comprises height greater than 4; determining whether the block comprises width greater than 4; in response to determining that the block comprises height greater than 4 and width greater than 4, signaling a low-frequency non-separable transform (LFNST) index; and in response to determining that the block comprises height that is equal to or less than 4 or width that is equal to or less than 4, refraining from signaling the LFNST index.

Example 4. A method of coding video data, the method comprising: determining whether a block comprises height greater than 4; determining whether the block comprises width greater than 4; determining whether separate-tree partitioning is used; in response to determining that separate-tree partitioning is used, using LFNST in response to determining that the block comprises height greater than 4 and width greater than 4.

Example 5. A method of coding video data, the method comprising: determining whether single-tree partitioning is used; and in response to determining that single-tree partitioning is used, signaling a LFNST index/flag for luma only.

Example 6. A method of coding video data, the method comprising: applying LFNST to luma blocks only.

Example 7. A method of coding video data, the method comprising: determining whether separate-tree partitioning is enabled; and in response to determining that separate tree partitioning is enabled, using LFNST for both luma and chroma blocks.

Example 8. A method of coding video data, the method comprising: determining whether single-tree partitioning is enabled; and in response to determining that single tree partitioning is enabled, using LFNST for only luma blocks and disabling LFNST for chroma blocks.

Example 9. A method of coding video data, the method comprising: determining whether a block comprises height greater than 4; determining whether the block comprises width greater than 4; determining whether a zero-out region is outside of an 8×8 LFNST subblock; in response to determining that the block includes width greater than 4, height greater than 4, and the zero-out region is outside of the 4×4 LFNST subblock, using 4×4 LFNST.

Example 10. The method of any of examples 1-9, wherein coding comprises decoding.

Example 11. The method of any of examples 1-10, wherein coding comprises encoding.

Example 12. A device for coding video data, the device comprising one or more means for performing the method of any of examples 1-11.

Example 13. The device of example 12, wherein the one or more means comprise one or more processors implemented in circuitry.

Example 14. The device of any of examples 12 and 13, further comprising a memory to store the video data.

Example 15. The device of any of examples 12-14, further comprising a display configured to display decoded video data.

Example 16. The device of any of examples 12-15, wherein the device comprises one or more of a camera, a computer, a mobile device, a broadcast receiver device, or a set-top box.

Example 17. The device of any of examples 12-16, wherein the device comprises a video decoder.

Example 18. The device of any of examples 12-17, wherein the device comprises a video encoder.

Example 19. A computer-readable storage medium having stored thereon instructions that, when executed, cause one or more processors to perform the method of any of examples 1-9.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving encoded data for a current block;
   determining whether single tree partitioning is enabled for the current block;
   decoding the encoded data to generate luma transform coefficients for the current block and chroma transform coefficients for the current block;
   in response to determining that the single tree partitioning is enabled for the current block, applying an inverse low-frequency non-separable transform (LFNST) to only the luma transform coefficients for the current block to produce a residual block for the current block; and
   reconstructing the current block of the video data using the residual block and a prediction block for the current block.

2. The method of claim 1, further comprising, in response to determining that the single tree partitioning is enabled for the current block, disabling the LFNST for the chroma transform coefficients for the current block.

3. The method of claim 1, further comprising:
receiving second encoded data for a second block;
determining whether separate-tree partitioning is enabled for the second block;
decoding the second encoded data to generate second luma transform coefficients for the second block and second chroma transform coefficients for the second block;
in response to determining that separate tree partitioning is enabled for the second block, applying the inverse LFNST to both the second luma transform coefficients and the second chroma transform coefficients to produce a second residual block for the second block; and
reconstructing the second block of the video data using the second residual block and a second prediction block for the second block.

4. The method of claim 1, further comprising:
determining whether the current block comprises a height greater than 4;
determining whether the current block comprises a width greater than 4; and
wherein applying the inverse LFNST to only the luma transform coefficients is further in response to determining that the height is greater than 4 and the width is greater than 4.

5. The method of claim 1, wherein applying the inverse LFNST comprises applying an inverse 8×8 LFNST to an 8×8 LFNST sub-block of the luma transform coefficients, the method further comprising:
determining whether the current block comprises a height greater than 4;
determining whether the current block comprises a width greater than 4;
determining whether a zero-out region of the luma transform coefficients is outside of the 8×8 LFNST subblock for the inverse LFNST; and
wherein applying the inverse LFNST to only the luma transform coefficients is further in response to determining that the height is greater than 4, the width is greater than 4, and the zero-out region of the luma transform coefficients is outside of the 8×8 LFNST subblock.

6. The method of claim 1, wherein applying the inverse LFNST comprises applying an inverse 4×4 LFNST to a 4×4 LFNST sub-block of the luma transform coefficients, the method further comprising:
determining whether the current block comprises a height greater than 4;
determining whether the current block comprises a width greater than 4;
determining whether a zero-out region of the luma transform coefficients is outside of the 4×4 LFNST subblock for the inverse LFNST; and
wherein applying the inverse LFNST to only the luma transform coefficients is further in response to determining that the height is greater than 4, the width is greater than 4, and that the zero-out region of the luma transform coefficients is outside of the 4×4 LFNST subblock.

7. The method of claim 1, further comprising:
in response to determining that the single tree partitioning is enabled for the current block, determining an LFNST index from the encoded data for the luma transform coefficients for the current block and refraining from determining an LFNST index from the encoded data for the chroma transform coefficients; and
wherein applying the inverse LFNST to only the luma transform coefficients is based on the LFNST index for the luma transform coefficients.

8. A method of encoding video data, the method comprising:
determining whether single tree partitioning is enabled for a current block;
generating residual values for the current block based on a prediction block for the current block;
applying a separable transform to the residual values to produce separable luma transform coefficients for the current block and separable chroma transform coefficients for the current block;
in response to determining that the single tree partitioning is enabled for the current block, applying a low-frequency non-separable transform (LFNST) to only the separable luma transform coefficients for the current block to produce luma transform coefficients for the current block and chroma transform coefficients for the current block;
encoding the luma transform coefficients and the chroma transform coefficients to produce encoded video data; and
outputting the encoded video data.

9. The method of claim 8, further comprising, in response to determining that the single tree partitioning is enabled for the current block, disabling the LFNST for the separable chroma transform coefficients for the current block.

10. The method of claim 8, further comprising:
determining that separate-tree partitioning is enabled for a second block
generating second residual values for the second block based on a second prediction block for the second block;
applying the separable transform to the second residual values to produce second separable luma transform coefficients for the second block and second separable chroma transform coefficients for the second block;
in response to determining that the separate-tree partitioning is enabled for the second block, applying the LFNST to the second separable luma transform coefficients for the second block to produce second luma transform coefficients for the second block and applying the LFNST to the second separable chroma transform coefficients for the second block to produce second chroma transform coefficients for the second block;
encoding the second luma transform coefficients and the second chroma transform coefficients to produce encoded video data; and
outputting the encoded video data.

11. The method of claim 8, further comprising:
determining whether the current block comprises a height greater than 4;
determining whether the current block comprises a width greater than 4; and
wherein applying the LFNST to only the luma transform coefficients is further in response to determining that the height is greater than 4 and the width is greater than 4.

12. The method of claim 8, wherein applying the LFNST comprises applying an 8×8 LFNST to an 8×8 LFNST sub-block of the separable luma transform coefficients, the method further comprising:

determining whether the current block comprises a height greater than 4;
determining whether the current block comprises a width greater than 4;
determining whether a zero-out region of the luma transform coefficients is outside of the 8×8 LFNST subblock for the LFNST; and
wherein applying the LFNST to only the luma transform coefficients is further in response to determining that the height is greater than 4, the width is greater than 4, and the zero-out region of the luma transform coefficients is outside of the 8×8 LFNST subblock.

13. The method of claim 8, wherein applying the LFNST comprises applying a 4×4 LFNST to a 4×4 LFNST subblock of the separable luma transform coefficients, the method further comprising:
determining whether the current block comprises a height greater than 4;
determining whether the current block comprises a width greater than 4;
determining whether a zero-out region of the luma transform coefficients is outside of the 4×4 LFNST subblock for the LFNST; and
wherein applying the LFNST to only the luma transform coefficients is further in response to determining that the height is greater than 4, the width is greater than 4, and that the zero-out region of the luma transform coefficients is outside of the 4×4 LFNST subblock.

14. The method of claim 8, further comprising, in response to determining that the single tree partitioning is enabled for the current block, signaling an LFNST index in the encoded data for the luma transform coefficients for the current block and refraining from signaling an LFNST index in the encoded data for the chroma transform coefficients.

15. A device for decoding video data, the device comprising:
a memory configured to store the video data; and
process circuitry configured to:
receive encoded data for a current block;
determine whether single tree partitioning is enabled for the current block;
decode the encoded data to generate luma transform coefficients for the current block and chroma transform coefficients for the current block;
in response to a determination that the single tree partitioning is enabled for the current block, applying an inverse low-frequency non-separable transform (LFNST) to only the luma transform coefficients for the current block to produce a residual block for the current block; and
reconstruct the current block of the video data using the residual block and a prediction block for the current block.

16. The device of claim 15, wherein the processing circuitry is further configured to, in response to the determination that the single tree partitioning is enabled for the current block, disable the LFNST for the chroma transform coefficients for the current block.

17. The device of claim 15, wherein the processing circuitry is further configured to:
receive second encoded data for a second block;
determine whether separate-tree partitioning is enabled for the second block;
decode the second encoded data to generate second luma transform coefficients for the second block and second chroma transform coefficients for the second block;
in response to a determination that separate tree partitioning is enabled for the second block, apply the inverse LFNST to both the second luma transform coefficients and the second chroma transform coefficients to produce a second residual block for the second block; and
reconstruct the second block of the video data using the second residual block and a second prediction block for the second block.

18. The device of claim 15, wherein the processing circuitry is further configured to:
determine whether the current block comprises a height greater than 4;
determine whether the current block comprises a width greater than 4; and
wherein to apply the inverse LFNST to only the luma transform coefficients is further in response to a determination that the height is greater than 4 and the width is greater than 4.

19. The device of claim 15, wherein to apply the inverse LFNST, the processing circuitry is configured to apply an inverse 8×8 LFNST to an 8×8 LFNST sub-block of the luma transform coefficients, wherein the processing circuitry is further configured to:
determine whether the current block comprises a height greater than 4;
determine whether the current block comprises a width greater than 4;
determine whether a zero-out region of the luma transform coefficients is outside of the 8×8 LFNST subblock for the inverse LFNST; and
wherein the processing circuitry is configured to apply the inverse LFNST to only the luma transform coefficients further in response to a determination that the height is greater than 4, the width is greater than 4, and the zero-out region of the luma transform coefficients is outside of the 8×8 LFNST subblock.

20. The device of claim 15, wherein to apply the inverse LFNST the processing circuitry is configured to apply an inverse 4×4 LFNST to a 4×4 LFNST sub-block of the luma transform coefficients, wherein the processing circuitry is further configured to:
determine whether the current block comprises a height greater than 4;
determine whether the current block comprises a width greater than 4;
determine whether a zero-out region of the luma transform coefficients is outside of the 4×4 LFNST subblock for the inverse LFNST; and
wherein the processing circuitry is configured to apply the inverse LFNST to only the luma transform coefficients further in response to a determination that the height is greater than 4, the width is greater than 4, and that the zero-out region of the luma transform coefficients is outside of the 4×4 LFNST subblock.

21. The device of claim 15, wherein the processing circuitry is further configured to:
in response to a determination that the single tree partitioning is enabled for the current block, determine an LFNST index from the encoded data for the luma transform coefficients for the current block and refrain from determining an LFNST index from the encoded data for the chroma transform coefficients; and
wherein the processing circuitry is configured to apply the inverse LFNST to only the luma transform coefficients based on the LFNST index for the luma transform coefficients.

22. The device of claim 15, further comprising a display configured to display the picture.

23. The device of claim 15, wherein the device comprises one or more of a camera, a computer, a mobile device, a broadcast receiver device, or a set-top box.

24. A device for encoding video data, the device comprising:
a memory configured to store the video data; and
process circuitry configured to:
determine whether single tree partitioning is enabled for a current block;
generate residual values for the current block based on a prediction block for the current block;
apply a separable transform to the residual values to produce separable luma transform coefficients for the current block and separable chroma transform coefficients for the current block;
in response to a determination that the single tree partitioning is enabled for the current block, applying a low-frequency non-separable transform (LFNST) to only the separable luma transform coefficients for the current block to produce luma transform coefficients for the current block and chroma transform coefficients for the current block;
encode the luma transform coefficients and the chroma transform coefficients to produce encoded video data; and output the encoded video data.

25. The device of claim 24, wherein the processing circuitry is further configured to, in response to a determination that the single tree partitioning is enabled for the current block, disable the LFNST for the separable chroma transform coefficients for the current block.

26. The device of claim 24, wherein the processing circuitry is further configured to:
determine that separate-tree partitioning is enabled for a second block generate second residual values for the second block based on a second prediction block for the second block;
apply the separable transform to the second residual values to produce second separable luma transform coefficients for the second block and second separable chroma transform coefficients for the second block;
in response to a determination that the separate-tree partitioning is enabled for the second block, apply the LFNST to the second separable luma transform coefficients for the second block to produce second luma transform coefficients for the second block and apply the LFNST to the second separable chroma transform coefficients for the second block to produce second chroma transform coefficients for the second block;
encode the second luma transform coefficients and the second chroma transform coefficients to produce encoded video data; and output the encoded video data.

27. The device of claim 24, wherein the processing circuitry is further configured to:
determine whether the current block comprises a height greater than 4;
determine whether the current block comprises a width greater than 4; and
wherein the processing circuitry is configured to apply the LFNST to only the luma transform coefficients further in response to determining that the height is greater than 4 and the width is greater than 4.

28. The device of claim 24, wherein to apply the LFNST, the processing circuitry is configured to apply an 8×8 LFNST to an 8×8 LFNST sub-block of the separable luma transform coefficients, wherein the processing circuitry is further configured to:
determine whether the current block comprises a height greater than 4;
determine whether the current block comprises a width greater than 4;
determine whether a zero-out region of the luma transform coefficients is outside of the 8×8 LFNST subblock for the LFNST; and
wherein the processing circuitry is configured to apply the LFNST to only the luma transform coefficients further in response to a determination that the height is greater than 4, the width is greater than 4, and the zero-out region of the luma transform coefficients is outside of the 8×8 LFNST subblock.

29. The device of claim 24, wherein to apply the LFNST, the processing circuitry is configured to apply a 4×4 LFNST to a 4×4 LFNST sub-block of separable luma transform coefficients, wherein the processing circuitry is further configured to:
determine whether the current block comprises a height greater than 4;
determine whether the current block comprises a width greater than 4;
determine whether a zero-out region of the luma transform coefficients is outside of the 4×4 LFNST subblock for the LFNST; and
wherein the processing circuitry is configured to apply the LFNST to only the luma transform coefficients further in response to a determination that the height is greater than 4, the width is greater than 4, and that the zero-out region of the luma transform coefficients is outside of the 4×4 LFNST subblock.

30. The device of claim 24, wherein the processing circuitry is further configured to, in response to a determination that the single tree partitioning is enabled for the current block, signal an LFNST index in the encoded data for the luma transform coefficients for the current block and refrain from signaling an LFNST index in the encoded data for the chroma transform coefficients.

* * * * *